: US 11,879,047 B2
(45) Date of Patent: Jan. 23, 2024

(12) United States Patent
Senoz et al.

(54) SINTERED POLYMERIC PARTICLES FOR POROUS STRUCTURES

(71) Applicant: Ticona LLC, Florence, KY (US)

(72) Inventors: Erman Senoz, Villa Hills, KY (US); Dian Chen, Bound Brook, NJ (US); Christopher McGrady, Walton, KY (US); Jun Luo, Hicksville, NY (US); Rong Luo, West Chester, PA (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 17/541,502

(22) Filed: Dec. 3, 2021

(65) Prior Publication Data

US 2022/0089828 A1 Mar. 24, 2022

Related U.S. Application Data

(63) Continuation of application No. 14/640,631, filed on Mar. 6, 2015, now Pat. No. 11,192,997.

(60) Provisional application No. 62/072,011, filed on Oct. 29, 2014, provisional application No. 61/949,574, filed on Mar. 7, 2014.

(51) Int. Cl.
C08J 9/24 (2006.01)
B01D 39/16 (2006.01)
C08J 9/00 (2006.01)

(52) U.S. Cl.
CPC ............ C08J 9/24 (2013.01); B01D 39/1661 (2013.01); C08J 9/0061 (2013.01); C08J 9/0066 (2013.01); C08J 9/0085 (2013.01); B01D 2239/125 (2013.01); C08J 2381/04 (2013.01); C08J 2423/08 (2013.01); C08J 2433/08 (2013.01)

(58) Field of Classification Search
None
See application file for complete search history.

(56) References Cited

U.S. PATENT DOCUMENTS

| | | | |
|---|---|---|---|
| 3,592,783 A | 7/1971 | Edmonds | |
| 3,954,932 A | 5/1976 | Coale | |
| 5,080,847 A | 1/1992 | Hazeyama | |
| 5,547,481 A | 8/1996 | Herding et al. | |
| 5,776,353 A * | 7/1998 | Palm | B01D 39/06 210/500.1 |

(Continued)

FOREIGN PATENT DOCUMENTS

| | | |
|---|---|---|
| EP | 0743085 | 11/1996 |
| EP | 2418255 | 2/2012 |

(Continued)

OTHER PUBLICATIONS

"Capillary Rheometer", "High Technology Fibers: Part B", Lewin and Preston, published by Marcel Dekker, New York, 1989, 4 total pages. (Year: 1989).*

(Continued)

Primary Examiner — Jonathan M Peo
(74) Attorney, Agent, or Firm — Dority & Manning, P.A.

(57) ABSTRACT

Disclosed are porous elements that include sintered polymeric particles. The polymeric particles can be formed of a thermoplastic composition that includes a polyarylene sulfide. The polymeric particles sintered to form the porous elements have a very narrow size distribution. The porous elements can maintain their functionality and morphology even when utilized in high temperature applications.

38 Claims, 11 Drawing Sheets

(56) References Cited

U.S. PATENT DOCUMENTS

| | | | |
|---|---|---|---|
| 5,804,074 A | 9/1998 | Takiguchi et al. | |
| 5,994,483 A * | 11/1999 | Bruck | C08L 81/02 |
| | | | 526/71 |
| 6,030,558 A | 2/2000 | Smith et al. | |
| 6,183,530 B1 | 2/2001 | Herding et al. | |
| 6,331,197 B1 | 12/2001 | Herding et al. | |
| 6,399,188 B1 | 6/2002 | Smith et al. | |
| 6,638,610 B1 | 10/2003 | Yao | |
| 6,669,946 B2 | 12/2003 | Boon-Falleur et al. | |
| 6,699,946 B1 * | 3/2004 | Lambla | C08L 81/02 |
| | | | 525/189 |
| 6,709,589 B1 | 3/2004 | Herding et al. | |
| 6,919,035 B1 | 7/2005 | Clough | |
| 7,094,464 B2 | 8/2006 | Mao et al. | |
| 7,125,490 B2 | 10/2006 | Clendenning et al. | |
| 7,456,025 B2 | 11/2008 | Mao et al. | |
| 7,507,469 B2 | 3/2009 | Mao et al. | |
| 7,674,517 B2 | 3/2010 | Ramsey et al. | |
| 7,795,346 B2 | 9/2010 | Martin et al. | |
| 7,833,615 B2 | 11/2010 | Ramsey et al. | |
| 8,141,717 B2 | 3/2012 | Wingo et al. | |
| 8,142,886 B2 | 3/2012 | Noble et al. | |
| 8,187,534 B2 | 5/2012 | Mao | |
| 8,349,400 B2 | 1/2013 | Ramsey et al. | |
| 8,628,843 B2 | 1/2014 | MacLennan | |
| 8,690,981 B2 | 4/2014 | Mao | |
| 8,852,122 B2 | 10/2014 | Mao et al. | |
| 8,920,339 B2 | 12/2014 | Mao et al. | |
| 9,101,311 B2 | 8/2015 | Mao et al. | |
| 9,198,609 B2 | 12/2015 | Mao et al. | |
| 9,346,046 B2 | 5/2016 | Kim et al. | |
| 9,370,731 B2 | 6/2016 | Mao | |
| 9,533,136 B2 | 1/2017 | Midgette et al. | |
| 9,696,241 B2 | 7/2017 | Mao et al. | |
| 10,195,635 B2 | 2/2019 | Sporrer | |
| 2001/0006993 A1 * | 7/2001 | Ring | C09D 167/00 |
| | | | 524/599 |
| 2004/0028890 A1 | 2/2004 | Yao | |
| 2006/0068201 A1 * | 3/2006 | Alexander | C08K 3/34 |
| | | | 428/357 |
| 2007/0034564 A1 | 2/2007 | Clendenning et al. | |
| 2007/0299219 A1 | 12/2007 | Higashioji et al. | |
| 2009/0306309 A1 * | 12/2009 | Ishio | C08L 81/02 |
| | | | 525/519 |
| 2010/0016516 A1 * | 1/2010 | Hayashi | D01D 10/02 |
| | | | 525/437 |
| 2010/0175850 A1 | 7/2010 | Kaucic et al. | |
| 2010/0176210 A1 | 7/2010 | Arthur et al. | |
| 2010/0189958 A1 * | 7/2010 | Naritomi | B29C 45/14311 |
| | | | 428/141 |
| 2010/0305217 A1 * | 12/2010 | Qiu | H01M 50/414 |
| | | | 427/245 |
| 2011/0290715 A1 * | 12/2011 | Mattern | B01D 69/046 |
| | | | 210/500.1 |
| 2011/0318818 A1 | 12/2011 | Beau et al. | |
| 2013/0069001 A1 | 3/2013 | Luo et al. | |
| 2013/0131210 A1 * | 5/2013 | Gerrard | C08J 3/24 |
| | | | 521/189 |
| 2013/0155597 A1 | 6/2013 | Luo et al. | |
| 2013/0156565 A1 | 6/2013 | Feng | |
| 2013/0168894 A1 | 7/2013 | Ren et al. | |
| 2013/0249357 A1 | 9/2013 | Luo et al. | |
| 2013/0273286 A1 | 10/2013 | Luo et al. | |
| 2013/0273287 A1 | 10/2013 | Luo et al. | |
| 2013/0273288 A1 | 10/2013 | Luo et al. | |
| 2013/0273289 A1 | 10/2013 | Luo et al. | |
| 2013/0273290 A1 | 10/2013 | Luo et al. | |
| 2014/0209969 A1 * | 7/2014 | Bushelman | C08G 69/26 |
| | | | 438/26 |
| 2015/0079614 A1 | 3/2015 | Mao et al. | |
| 2015/0185211 A1 | 7/2015 | Mao et al. | |
| 2017/0352065 A1 | 12/2017 | Lewis | |
| 2018/0036994 A1 | 2/2018 | Mao et al. | |

FOREIGN PATENT DOCUMENTS

| | | | |
|---|---|---|---|
| JP | 02-298527 | 12/1990 | |
| JP | 3579957 | 10/2004 | |
| JP | 5051428 | 10/2012 | |
| WO | WO2010/021612 A1 | 2/2010 | |
| WO | WO 2010/120977 A1 | 10/2010 | |
| WO | WO 2011/119550 A2 | 9/2011 | |
| WO | WO-2011119550 A2 * | 9/2011 | C08K 5/098 |
| WO | WO2011/140053 A1 | 11/2011 | |
| WO | WO2013/040289 A2 | 3/2013 | |
| WO | WO2013/043566 A2 | 3/2013 | |
| WO | WO-2013040289 A2 * | 3/2013 | C08J 9/0066 |
| WO | WO2013/066663 A2 | 5/2013 | |
| WO | WO 2013/083467 A1 | 6/2013 | |
| WO | WO2013/090172 A1 | 6/2013 | |
| WO | WO-2013083467 A1 * | 6/2013 | A61L 15/24 |
| WO | WO2013/101315 A1 | 7/2013 | |
| WO | WO2013/154741 A2 | 10/2013 | |
| WO | WO 2018/071375 A1 | 4/2018 | |
| WO | WO 2018/152472 A1 | 8/2018 | |
| WO | WO 2018/213247 A1 | 11/2018 | |
| WO | WO 2019/036538 A1 | 2/2019 | |

OTHER PUBLICATIONS

Ticona LLC, International Patent Application No. PCT/US2015/019155, International Search Report and Written Opinion, dated Aug. 21, 2015 (19 pages).

Capillary Rheometer, Lewin and Preston, "High Technology Fibers: Part B," published by Marcel Dekker, New York, 1989, 4 pages.

* cited by examiner

SINTERED POLYMERIC PARTICLES FOR POROUS STRUCTURES

CROSS REFERENCE TO RELATED APPLICATION

The present application is a continuation of U.S. application Ser. No. 14/640,631, now U.S. Pat. No. 11,192,997, filed on Mar. 6, 2015, which claims filing benefit of U.S. Provisional Patent Application Ser. No. 61/949,574 having a filing date of Mar. 7, 2014, and of U.S. Provisional Patent Application Ser. No. 62/072,011 having a filing date of Oct. 29, 2014, all of which are incorporated herein by reference in their entirety.

BACKGROUND OF THE INVENTION

Separation operations involving high temperature fluids encompass a wide variety of applications including liquid filtration, gas filtration, fluid separations, catalyst bed reactions, desiccant bed operations, and so forth. The high temperatures of the fluids involved are often problematic as the separation materials must withstand the fluid temperatures without deformation in order to function properly. For instance, glass fibers have been utilized in forming high temperature filter elements. While glass can function well under high temperatures, such traditional separation materials can be quite expensive. In response, separation materials based upon synthetic polymers have been developed as a less expensive alternative.

Polymeric separation materials present difficulties as well, as even engineering polymers designed for high performance will often exhibit creep or other forms of deformation during high temperature separation applications. For instance, polyarylene sulfides are high performance polymers that may withstand high thermal, chemical, and mechanical stresses and are beneficially utilized in a wide variety of applications. However, difficulties have been encountered when attempting to use these materials in high temperature separation applications due to the tendency of the formed separation materials to exhibit creep or other forms of deformation that negatively affect operational outcomes.

What are needed in the art are polymer-based separation materials that can be utilized in high temperature applications without deformation.

SUMMARY OF THE INVENTION

Disclosed in one embodiment is a porous element comprising sintered polymeric particles. The polymeric particles are formed of a thermoplastic composition that includes a polyarylene sulfide. The polymeric particles have a narrow size distribution. For instance, 50% of the particles can have a size that fall between about 60% of the median particle size and about 140% of the median particle size.

In another embodiment, disclosed is a filter element. The filter element can include sintered polymeric particles that are formed of a thermoplastic composition. The thermoplastic composition can include a polyarylene sulfide. The filter element can have an average pore size of from about 10 micrometers to about 150 micrometers and a porosity of about 30% or greater. The filter element can withstand high temperature operations without creep or other forms of deformation. For instance, the filter element can be utilized with a filtrate at about 100° C. or greater.

A method for forming a porous element is also described. For instance, a method can include increasing the melt viscosity of a thermoplastic composition that includes a polyarylene sulfide. By way of example, following the increase, the thermoplastic composition can have a melt viscosity of about 10,000 poise or greater as determined by use of a capillary rheometer at 316° C. and 400 sec-1 with the viscosity measurement taken after five minutes of constant shear. The method can also include forming polymeric particles comprising the thermoplastic composition. The formed polymeric particles can have a median particle size in at least one dimension of about 1000 micrometers or less and can have a particle size distribution such that 50% of the polymeric particles have a size between about 60% of the median particle size and about 140% of the median particle size. The method can also include sintering the polymeric particles, the porous element comprising the sintered polymeric particles.

BRIEF DESCRIPTION OF THE FIGURES

The present disclosure may be better understood with reference to the following figures.

DETAILED DESCRIPTION

Figure 1:
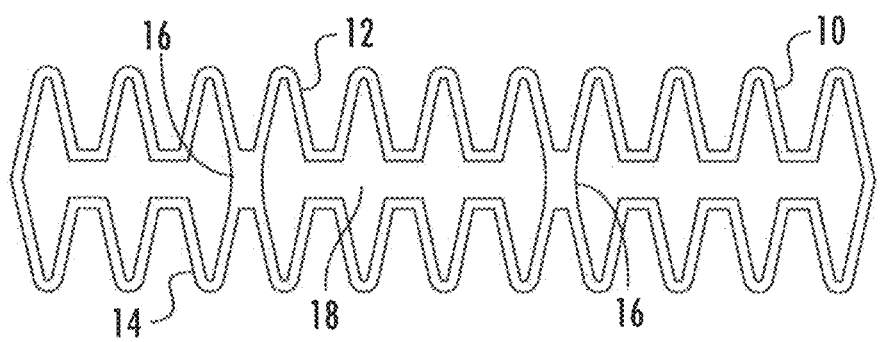
FIG. 1 illustrates a cross-sectional view of a separation element.

It is to be understood by one of ordinary skill in the art that the present discussion is a description of exemplary embodiments only, and is not intended as limiting the broader aspects of the present disclosure.

The present disclosure is generally directed to porous elements that include sintered polymeric particles. More specifically, the polymeric particles can be formed of a thermoplastic composition that includes a polyarylene sulfide. Beneficially, the elements can maintain their functionality and morphology even when utilized in high temperature applications. For instance, in one embodiment, an element that includes the sintered polymeric particles can be a filter element that can be used in high temperature applications, i.e., in conjunction with high temperature fluids such as filtrates at a temperature of about 100° C. or greater, about 130° C. or greater, about 150° C. or greater, about 160° C. or greater, about 170° C. or greater, or about 180° C. or greater. For instance, the porous element can be utilized in a separation application with a high temperature fluid at a temperature of up to about 220° C. in one embodiment. Elements of any size and shape are also encompassed herein such as tubular structures (e.g., pipes).

The porous element can be formed of a plurality of sintered polymeric particles that have a narrow size distribution. While not wishing to be bound to any particular theory, it is believed that the narrow size distribution of the polymeric particles can more evenly distribute stress throughout the sintered element during high temperature applications, which can prevent deformation of the element, e.g., creep. For instance, the narrow size distribution of the polymeric particles can lead to a more uniform pore size and porosity throughout the element, which can equalize cross sectional flow and thermal characteristics within the element during use. This can prevent internal stress during use and thus prevent deformation that can negatively affect desired separations.

The narrow size distribution of the polymeric particles can be described in terms of the median particle size. For instance, the maximum particle diameter below which 75% of the sample volume exists ($d_{75}$) can be between about 120% and about 140% of the median particle size ($d_{50}$) and the maximum particle size below which 25% of the sample volume exists ($d_{25}$) can be between about 60% and about 80% of the median particle size. Thus, 50% of a sample volume can have a particle size that falls between about 60% and about 140% of the median particle size. In one embodiment, 50% of a sample volume can have a particle size that falls between about 80% and about 120% of the median particle size.

The $d_{10}$ value (the maximum particle diameter below which 10% of the sample volume exists) can be between about 35% and about 60% of the median particle size, and the $d_{90}$ value (the maximum particle diameter below which 90% of the sample volume exists) can be between about 135% and about 175% of the median particle size ($d_{50}$). Thus, 80% of a sample volume can have a particle size that falls between about 35% and about 175% of the median particle size, or between about 60% and about 135% of the median particle size, in one embodiment.

In general, the polymeric particles can have a pre-sintered median particle size ($d_{50}$) in at least one dimension of about 1000 micrometers or less, about 600 micrometers or less, or about 500 micrometers or less. The polymeric particles can generally have a pre-sintered size of about 25 micrometers or greater. For instance, the polymeric particles can have a pre-sintered size of from about 50 micrometers to about 600 micrometers, from about 100 micrometers to about 400 micrometers, or from about 150 micrometers to about 175 micrometers, in some embodiments.

While the particles can be spherical in one embodiment, this is not a requirement, and the particles can have any suitable shape including, without limitation, elliptical, polyhedral, disc-like, amorphous, tubular, fibrous, multi-lobal (e.g., popcorn like), etc., as well as mixtures of particle shapes. In general, in those embodiments in which the particles have an elongated shape (i.e., an aspect ratio of length over cross sectional dimension L/D of greater than 1), the aspect ratio can be about 100 or less. In one embodiment, a high aspect ratio polymeric particle can have an aspect ratio of about 50 or less, about 30 or less, about 10 or less, about 5 or less, about 4 or less, about 3 or less, or about 2 or less in some embodiments.

A separation element formed of the sintered polymeric particles can have a porosity that is useful in a wide variety of separation applications. In general, the separation element can have a porosity that is about 30% or greater, about 40% or greater, or about 50% or greater in some embodiments. As utilized herein, the term 'porosity' generally refers to the ratio of the total pore volume of the element to the total bulk volume of the element.

The pore size of the element can vary depending on, e.g., median particle size, sintering conditions, coatings, other materials included in the structure such as sacrificial materials or larger/smaller particles, etc. In general, the element can have a median pore size of from about 10 micrometers to about 150 micrometers, from about 25 micrometers to about 130 micrometers in one embodiment, or from about 50 micrometers to about 125 micrometers in one embodiment.

The absorption ability of a separation element will depend upon the specific application characteristics as well as the particular element characteristics, as is known. For instance, when utilized in a filtration application, a separation element can absorb up to about 1 milligram solid per cubic meter, but this amount can obviously vary depending upon the solid or molecular constituent to be separated as well as the nature of the filter element, e.g., the presence of functional groups on the element that specifically target the constituent to be separated.

The polymeric particles can be formed from a thermoplastic composition that includes a polyarylene sulfide optionally in conjunction with one or more additives. The thermoplastic composition can provide very good tensile characteristics to the element. For example, a separation element can have a tensile elongation at break that can be quite low, for instance less than about 15%, less than about 10%, less than about 5%, or less than about 2% in some embodiments. The element may have a tensile strength at break of about 2 MPa or greater, about 2.5 MPa or greater, about 5 MPa or greater, about 10 MPa or greater or about 12 MPa or greater in some embodiments. In addition, the separation element can have a tensile modulus of about 40 MPa or greater, for instance about 50 MPa or greater or about 100 MPa or greater in some embodiments. Tensile characteristics can be determined according to ISO Test No. 527 at a temperature of 23° C. and a test speed of 5 mm/min or 50 mm/min (technically equivalent to ASTM D623 at 23° C.).

The thermoplastic composition can also exhibit good processing characteristics for use in forming a particle to be sintered, for instance as demonstrated by the melt viscosity of the composition. For instance, the thermoplastic composition can have a melt viscosity of greater than about 2500 poise (250 Pa-s), greater than about 3500 poise (350 Pa-s), greater than about 4200 poise (420 Pa-s), greater than about 4500 poise (450 Pa-s), or greater than about 8500 (850 Pa-s) poise in some embodiments. Melt viscosity can be determined by use of a capillary rheometer at 316° C. and 400 sec$^{-1}$ with the viscosity measurement taken after five minutes of constant shear.

In one embodiment, the thermoplastic composition can include additives and/or can be subjected to processing that can increase the melt viscosity of the thermoplastic composition. This may be beneficial as a thermoplastic composition with a relatively high melt viscosity can have a larger sintering window (i.e., the time and temperature combination utilized during sintering) that can be utilized in forming the porous elements comprising the sintered particles. For example, the treated thermoplastic composition can have a melt viscosity of about 3,000 poise (300 Pa-s) or greater, about 5,000 poise (500 Pa-s) or greater, about 10,000 poise (1,000 Pa-s) or greater, about 12,000 poise (1,200 Pa-s) or greater, or about 15,000 poise (1,500 Pa-s) or greater in some embodiments.

In one embodiment, the thermoplastic composition can be formed to include additives and/or formed according to treatment processes so as to increase the temperature window of a sintering process. For instance, a narrow sintering window can lead to an under-sintered product in which the part is partially un-sintered (e.g., dusty) or can lead to a partially melted product in which warpage, shrinkage, and cracks are more likely to occur. Localized melting of the particles used in forming the sintered part can also lead in inconsistent fluid flow through a filtration element, which is problematic.

The complex viscosity of the thermoplastic composition can remain low at high temperatures, which can make the separation elements highly suitable for high temperature applications. For instance, the thermoplastic composition can have a complex viscosity of about 20,000 poise or less at temperatures of about 200° C. or greater. Complex viscosity can be determined by a Low shear sweep (ARES) utilizing an ARES-G2 (TA Instruments) testing machine equipped with 25 mm SS parallel plates and using TRIOS software. A dynamic strain sweep can be performed on a pellet sample prior to the frequency sweep, in order to find LVE regime and optimized testing condition. The strain sweep can be done from 0.1% to 100%, at a frequency 6.28 rad/s. The dynamic frequency sweep for each sample can be obtained from 500 to 0.1 rad/s, with a strain amplitude of 3%. The gap distance can be kept at 1.5 mm for the pellet samples. The temperature can be set at 310° C. for all samples.

The thermoplastic composition can also exhibit low shrinkage upon sintering of the polymeric particles to form a sintered element. For instance, shrinkage of an element during sintering can be about 8% or less, about 5% or less, about 4% or less or about 3% or less. Shrinkage during sintering can be determined by comparing a dimension of the piece prior to and following sintering. For instance, if L1 is a diameter of the mold used to hold the element during sintering and L2 is the equivalent diameter of the sintered element, then % shrinkage=(L1−L2)/L1×100. The shrinkage values can be obtained for multiple different areas (e.g., top and bottom) of the element to determine warpage (uneven sintering and shrinkage).

The thermoplastic composition for forming the particles can be formed according to known methods. For example, the components of the thermoplastic composition may be melt-kneaded in a melt processing unit such as an extruder. In one embodiment, the composition may be melt processed in an extruder that includes multiple zones or barrels as well as feed lines, vents, temperature controls, etc. that can be independently operated. A general purpose screw design can be used to melt process the thermoplastic composition.

The polyarylene sulfide may be a polyarylene thioether containing repeat units of the formula (I):

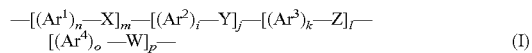

$$—[(Ar^1)_n—X]_m—[(Ar^2)_i—Y]_j—[(Ar^3)_k—Z]_l—[(Ar^4)_o—W]_p—$$ (I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—, and n, m, i, j, k, l, o, and p are independently zero or 1, 2, 3, or 4, subject to the proviso that their sum total is not less than 2. The arylene units $Ar^1$, $Ar^2$, $Ar^3$, and AO may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be synthesized prior to forming the thermoplastic composition, though this is not a requirement of a process. For instance Fortron® polyphenylene sulfide available from Ticona Engineering Polymers of Florence, Ky., USA can be purchased and utilized as the polyarylene sulfide.

Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

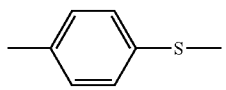

(II)

and segments having the structure of formula (III):

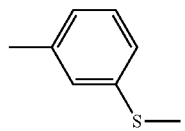

(III)

or segments having the structure of formula (IV):

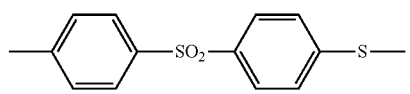

(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide, N,N-dimethylacetamide, N-methylcaprolactam, tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide.

A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media as is known. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture.

According to one embodiment, the polyarylene sulfide can be functionalized, for instance to encourage bond formation between the polyarylene sulfide and other components of the thermoplastic composition. For instance, the polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

The thermoplastic composition generally can include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

In addition to the polyarylene sulfide polymer, the thermoplastic composition can include one or more additives. In one embodiment, the thermoplastic composition can include an impact modifier, which, among other benefits, can increase the melt viscosity of a thermoplastic composition that includes the polyarylene sulfide. An impact modifier can be blended with the polyarylene sulfide or, in one particular embodiment; the polyarylene sulfide can be crosslinked to an impact modifier, which can further increase the melt viscosity of the thermoplastic composition and the sintering window of the polymer particles. According to this embodiment, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

By way of example, when included, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent for those embodiments in which the polyarylene sulfide is crosslinked with the impact modifier. For instance, the impact modifier can be modified with a mole fraction of from about 0.01 to about 0.5 of one or more of the following: an $\alpha$, $\beta$ unsaturated dicarboxylic acid or salt thereof having from about 3 to about 8 carbon atoms; an $\alpha$, $\beta$ unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl (meth)acrylate-maleic anhydride terpolymers, ethylene-alkyl (meth)acrylate-glycidyl (meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

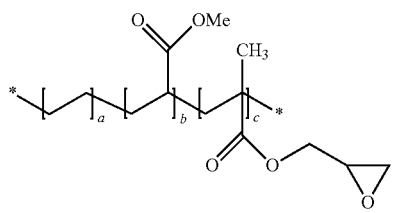

wherein, a, b, and c are 1 or greater.

In another embodiment the impact modifier can be a random copolymer of ethylene, ethyl acrylate and maleic anhydride having the following structure:

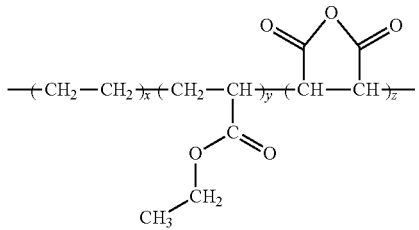

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt. % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to about 100,000 grams per mole, with a polydispersity index typically ranging from 2.5 to 7.

When present, the impact modifier may be present in the composition in an amount from about 0.05% to about 40% by weight, from about 0.05% to about 37% by weight, or from about 0.1% to about 35% by weight.

During formation of the thermoplastic composition, the impact modifier can be added to the composition in conjunction with the polyarylene sulfide or downstream of the polyarylene sulfide. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

In those embodiments in which the polyarylene sulfide is crosslinked with an impact modifier, the thermoplastic composition can include a crosslinking agent. The crosslinking agent can include a polyfunctional compound that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1, 3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

Halogen-containing compounds (e.g., polyarylenes of the composition) may be crosslinked by their reaction with metal oxides. Examples of useful metal oxides include, but are not limited to, zinc oxide, calcium oxide, and lead oxide. The metal oxide can be used alone or in conjunction with its corresponding metal fatty acid complex (e.g., zinc stearate, calcium stearate, etc.), or with the organic and fatty acids added alone, such as stearic acid, and optionally other curatives, such as sulfur or a sulfur compound, an alkylperoxide compound, diamines, or derivatives thereof.

Metal compounds including metal oxides and/or metal salts of fatty acids may be utilized in crosslinking other components of the thermoplastic composition, in addition to or alternative to halogen-containing compounds. For instance, metal containing compounds can react with functional groups of the impact modifier (e.g., epoxide groups) to crosslink the impact modifier with itself and/or with other components of the thermoplastic composition. A fatty acid metal salt can be, for example, an alkali metal salt or alkali earth metal salt of a fatty acid having 6 to 40 carbon atoms, as exemplified by calcium stearate, sodium montanate and calcium montanate, without limitation thereto.

When present, the thermoplastic composition may generally include the crosslinking agent in an amount from about 0.05 wt. % to about 2 wt. % by weight of the polyarylene sulfide composition, from about 0.07 wt. % to about 1.5 wt. % by weight of the thermoplastic composition, or from about 0.1 wt. % to about 1.3 wt. % of the thermoplastic composition in some embodiments.

The crosslinking agent can generally be added to the melt processing unit following mixing of the polyarylene sulfide and the impact modifier. For instance, the crosslinking agent can be added to the composition at a downstream location following addition of polyarylene sulfide and the impact modifier (either together or separately) to the melt processing unit. This can ensure that the impact modifier has become dispersed throughout the polyarylene sulfide prior to addition of the crosslinking agent. Following addition of the crosslinking agent, the composition can be mixed to distribute the crosslinking agent throughout the composition and encourage reaction between the crosslinking agent, the impact modifier, and, in one embodiment, with the polyarylene sulfide.

Another additive that may be included in the thermoplastic composition is one or more colorants as are generally known in the art. For instance, the thermoplastic composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes.

Pigments that can be incorporated in a thermoplastic composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the thermoplastic composition can encompass, without limitation, antimicrobials, lubricants, pigments or other colorants, impact modifiers, antioxidants, stabilizers (e.g., UV stabilizers and/or heat stabilizers including organophosphites such as Doverphos® products available from Dover Chemical Corporation), surfactants, flow promoters, solid solvents, fillers such as fibrous or particulate fillers (e.g., glass fibers, mineral fillers, etc.), and other materials added to enhance properties and processability. Such optional materials may be employed in the thermoplastic composition in conventional amounts and according to conventional processing techniques, for instance through addition to the composition at the main feed throat.

The thermoplastic composition can also include polyarylene sulfide blended with other polymers. For instance, the polyarylene sulfide can be blended with polyolefins (e.g., polyethylene, polypropylene, high molecular weight polyethylene, ultrahigh molecular weight polyethylene, etc.), polyaryletherketones (e.g., polyetheretherketone, polyetherketoneketone, polyetherketone, etc.), halogenated polymers (e.g., polytetrafluoroethylene, etc.), and so forth. In addition, the thermoplastic composition can include blends of different polyarylene sulfides such as polyarylene sulfides of different melt flow characteristics (i.e., different molecular weights), different crosslink densities, different monomer compositions, etc.

Following addition of all components to the thermoplastic composition the composition is thoroughly mixed in the remaining section(s) of the extruder and extruded through a die.

The final extrudate can be further processed to form the polymeric particles with a narrow size distribution. For instance, pellets of the extrudate can be converted into particulates according to any suitable method including, without limitation, mechanical grinding, cryogenic grinding, underwater pelletizing, spray drying, flash crystallization, etc.

By way of example, a cryogenic grinding process can be used in which the thermoplastic composition becomes brittle by bringing it into direct contact with liquid nitrogen and a stream of cold vaporized nitrogen, for instance in countercurrent flow with the thermoplastic composition. Once brittle, the thermoplastic composition is fed to an impact mill, for instance a hammer mill, a jet mill, a pin mill, a disk attrition mill, or any other suitable impact device that can interact with the brittle composition and form the particles. Cryogenic grinding can be used to prepare polymeric particles of varying sizes. But because cryogenic grinding provides little control over the sizes of the particles it produces, powders formed using this technique may be further processed, e.g., screened, to ensure that the particles to be sintered are of the desired median size with the desired narrow size distribution.

Underwater pelletizing can also be used to form the polymeric particles for sintering. Typically, underwater pelletizing can be utilized to produce particles having diameters of greater than about 35 micrometers. It may be a useful formation process in one embodiment as it can provide good control over the size of the particles produced, in many cases eliminating the need for an additional screening step and reducing the amount of wasted material.

Polymeric particle formation using underwater pelletizing typically requires an extruder or melt pump, an underwater pelletizer, and a drier. The thermoplastic composition is fed into an extruder or a melt pump and heated until semi-molten. The semi-molten material is then forced through a die. As the material emerges from the die, at least one rotating blade cuts it into pieces. The rate of extrusion and the speed of the rotating blade(s) determine the shape of the particles formed, while the diameter of the die holes determines their average size. Water, or some other liquid or gas capable of increasing the rate at which these initial particles cool, flows over the cutting blade(s) and through the cutting chamber. This coagulates the cut material into particles, which are then separated from the coolant (e.g., water), dried, and expelled into a holding container.

Average particle size can be adjusted simply by changing dies, with larger pore dies yielding proportionally larger particles. The average shape of the particles can be optimized by manipulating the extrusion rate and the temperature of the water used in the process.

In another embodiment, the particles can be formed according to a flash crystallization process. Flash crystallization utilizes a sudden change in pressure under adiabatic conditions to drive particle formation. The method can produce particles within a relatively narrow particle size distribution. The adiabatic pressure change of the process solution causes a fast temperature change, which in turn is a strong driving force for nucleation and particle formation. The polymeric solution is generally also atomized by a nozzle which further promotes the formation of small particles by impeding growth. Flash crystallization produces a particle slurry rather than a dry powder as is the case with spray drying.

By way of example, a flash crystallization process can include heating the thermoplastic composition components (e.g., as a masterbatch) in the presence of a solvent system to form a mixture, and thereafter cooling the mixture to precipitate the polymeric particles therefrom.

The mixture may be in the form of a solution, suspension, dispersion, etc. Although not necessarily required, one benefit of a flash crystallization process is that it may be performed within a single vessel, such as a titanium reactor, stainless-steel reactor, etc., although multiple vessels may be employed if so desired.

Any of a variety of solvents may be employed, such as water, organic solvents, etc. Particularly suitable organic solvent include aprotic solvents, such as halogen-containing solvents (e.g., methylene chloride, 1-chlorobutane, chlorobenzene, 1,1-dichloroethane, 1,2-dichloroethane, chloroform, and 1,1,2,2-tetrachloroethane), ether solvents (e.g., diethyl ether, tetrahydrofuran, and 1,4-dioxane), ketone solvents (e.g., acetone and cyclohexanone); ester solvents (e.g., ethyl acetate); lactone solvents (e.g., butyrolactone); carbonate solvents (e.g., ethylene carbonate and propylene carbonate); amine solvents (e.g., triethylamine and pyridine); nitrile solvents (e.g., acetonitrile and succinonitrile); amide solvents (e.g., N,N'-dimethylformamide, N,N'-dimethylacetamide, tetramethylurea and N-methylpyrrolidone); nitro-containing solvents (e.g., nitromethane and nitrobenzene); sulfide solvents (e.g., dimethylsulfoxide and sulfolane); and so forth.

Once charged into the vessel, the components (e.g., polyarylene sulfide, solvent system, and any other additives) may be heated to a temperature to form a mixture. The temperature is generally selected to be lower than the melting temperature of the polyarylene sulfide, yet higher than the melting temperature of additives of the composition (e.g., an impact modifier). The melting temperature of the polyarylene sulfide is typically from about 275° C. to about 350° C., and in some embodiments, from about 280° C. to about 300° C. For example, in certain embodiments, the temperature may be from about 150° C. to about 275° C., in some embodiments, from about 200° C. to about 270° C., and in some embodiments, from about 250° C. to about 270° C. In certain cases, heating may be conducted at a temperature that is above the atmospheric pressure boiling point of a solvent in the mixture. NMP, for instance, has a boiling point at atmospheric pressure of about 203° C. In such embodiments, the heating is typically conducted under a relatively high pressure, such as above 1 atm, in some embodiments above about 2 atm, and in some embodiments, from about 3 to about 10 atm. Upon formation and heating of the mixture, it is thereafter subjected to a cooling cycle that may include one or multiple steps to form the polymeric particles.

The resulting cooled slurry can be filtered and washed (e.g., with water or other solvent) to remove the solvent. The washed powder may then optionally be dried, typically at a temperature that is less than the melting temperature of the polyarylene sulfide to inhibit fusion or agglomeration of the powder.

Regardless of the particle formation process, prior to sintering, the polymeric particles can be pre-treated and/or combined with other materials, other components of a filtration device, and so forth. For instance, in one embodiment, the polymeric particles can be heat treated prior to sintering. Heat treatment can increase the melt viscosity of the thermoplastic composition that forms the particles, which can broaden the sintering window (i.e., the time and temperature combination utilized during sintering). A heat treatment can generally be carried out in air over a period of time, for instance, the polymeric particles can be heat treated in air at a temperature of from about 240° C. to about 290° C., for from about 250° C. to about 270° C. in some embodiments. The polymeric particles can be held at the increased temperature for about 1 hour or more for the heat treatment, for instance from about 1 hour to about 4 hours, or from about 2 hours to about 3 hours in some embodiments.

A heat treatment can be carried out at any point prior to sintering. For instance, the thermoplastic composition can be heat treated prior to formation of the polymeric particles. Alternatively, the polymeric particles can be heat treated following formation and prior to combination with any additives to be included with the particles in a separation device. In one embodiment, a blend of the polymeric particles and desired additives can first be formed and the particles can be heat treated following formation of the blend. In one embodiment, the particles, optionally in conjunction with additives in a blend, can be formed to the final shape of the separation element, e.g., placed in a mold or extruded to the final shape, and the shaped material can be heat treated prior to the sintering process.

While the polymeric particles can be sintered to form the separation element with no other additives, in one embodiment, other materials can be combined with the polymeric particles and a monolithic composite separation element can be formed via the sintering process. In general, the polymeric particles incorporating a polyarylene sulfide can make up about 40% or more of the separation element, for instance about 50% or more by weight, about 60% or more by weight, or about 70% or more by weight.

Additional materials as may be incorporated into the separation element can include secondary particles. Secondary particles may be combined with the polymeric particles and the mixture of particles can be sintered together. When included, secondary particulate material may generally be included in the sintered element an amount of about 90% or less by weight of the sintered element, for instance about 80% or less, about 70% or less, about 60% or less, about 50% or less, about 40% or less, or about 30% or less by weight of the sintered element.

Secondary particles as may be combined with the polymeric particles can be of any useful material and can have any suitable shape. For instance, additional particles can be solid or hollow and can be spherical, polygonal, elongated, etc. Secondary particles can also include a surface treatment, for instance to encourage interaction between the polymeric particles and the secondary particles.

In one embodiment, secondary particles that can be combined with the polymeric particles can be a sacrificial particle that can be removed following sintering, which can affect the porosity of the formed element. For example, a sacrificial material that can be dissolved by a solvent that will not dissolve the polymeric particles can be utilized to form secondary particles. Following sintering, the sacrificial material (e.g., a salt soluble in an aqueous or organic medium, optionally under heat and/or pressure) can be removed from the formed element, which can increase the porosity of the element.

In one embodiment, secondary particles can be inorganic particles. Inorganic particles may include, without limitation, silica, quartz powder, silicates such as calcium silicate, aluminum silicate, kaolin, talc, mica, clay, diatomaceous earth, wollastonite, calcium carbonate, zeolites, carbon molecular sieves, activated carbon, mixtures of inorganic particles, and so forth.

A secondary particle can be an electrically conductive particle such as, without limitation, carbon black, graphite, graphene, carbon fiber, carbon nanotubes, a metal powder, and so forth. In one embodiment, adequate electrically conductive secondary particles can be included in the separation element such that the separation element has a volume specific resistance of equal to or less than about $10^9$ ohms cm.

In one embodiment, a fibrous filler can be included in the sintered element. The fibrous filler may include one or more fiber types including, without limitation, polymer fibers (e.g., polyarylene sulfide fibers), glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary. In one embodiment, the fibers can have an initial length of from about 3 mm to about 5 mm. Fiber diameters can vary depending upon the particular fiber used. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm. Optionally, the fibers may be pretreated with a sizing so as to encourage interaction with the particles of the separation element.

Other materials as are generally known in the art can also be included in the element, as desired. By way of example, binder materials such as secondary polymeric materials may be included, which can likewise be in the form of particles (though this is not a requirement). Such secondary polymeric materials can include, without limitation, polyolefins (polyethylene, polypropylene, etc.), high molecular weight polyolefins and ultrahigh molecular weight polyolefins (e.g., GUR® UHMW-PE available from Ticona Engineering Polymers of Florence, Kentucky), polyesters (polyethylene terephthalate, polybutylene terephthalate, etc.), thermoplastic elastomers, liquid crystal polymers, polycarbonates, polyamides (e.g., nylon), polyamines, phenolic resins, epoxies, polytetrafluoroethylene, polyvinylidene fluoride, and so forth. When present, a secondary polymeric additive can generally be present in the element in an amount of about 50% or less or about 40% or less of the total polymeric content of the separation element.

Sintering and shaping processes can be used for forming the separation element. For instance, the polymeric particles can be blended with any secondary particles, fibers, or other additives and the blended mixture can be placed in a mold or formed as a sheet. For instance, a mold having the desired shape of the separation element, e.g., a cylinder, a tubular shape, a three dimensional block, or a unique shape for a particular application, can be used. A mold can generally be formed of a metal or a metal alloy such as, without limitation, stainless steel or aluminum.

In one embodiment, the polymeric particles can be combined with a binder or other material in liquid form at the temperature of formation and the thus-formed composite can be shaped according to a polymeric molding process such as, without limitation, rotomolding, extrusion, injection molding, thermoforming, or the like. For example, the polymeric particles can be combined with a polymeric composition in melt form to form a composite including the particles and the composition and the composite can be extruded to form an element. A composition can include sacrificial materials therein that can affect the porosity of the final sintered product. By way of example, the composition can include sacrificial particles, as discussed above, or a sacrificial fluid, such as an organic or aqueous fluid (e.g., an oil) that can be removed following extrusion and/or sintering, for instance via rinsing or degradation of the sacrificial material, and thereby affect the porosity of the formed element.

In one embodiment, a blend including a polymeric composition and the polymeric particles can include a blowing agent. For instance, the polymeric particles can be combined with a polymeric composition that includes a blowing agent to form a blend. The blend can then be shaped, as in an extrusion process. In one embodiment, the extrusion process can be carried out at a temperature at which the blowing agent decomposes or reacts to form voids in the extruded blend. Following the extrusion, the polymeric particles of the formed material can be sintered to form the porous element.

Alternatively, the sintering can be carried out at a temperature at which the blowing agent decomposes or reacts to form voids during the sintering process, rather than during the extrusion (or other formation) process.

Examples of blowing agents can include materials that can release water in the form of water vapor at a formation, e.g., extrusion, temperature or at a sintering temperature. Such blowing agents include, without limitation, metal salts of Group 1 or 2 of the Periodic Table in which the anion is a phosphate, chromate, sulfate, borate, carbinate, or the like, said salts containing hydrate water. Suitable salts include, for instance, hydrated potassium aluminum sulfate, magnesium sulfate dihydrate, magnesium sulfate heptahydrate, calcium sulfate dihydrate, potassium citrate monohydrate, tricalcium phosphate monohydrate, sodium perborate tetrahydrate, barium acetate monohydrate and barium borate heptahydrate, among others.

Blowing agents can also include water-releasing metal hydroxides such as aluminum hydroxides including aluminum trihydrate (ATH), also known as aluminum trihydroxide ($Al(OH)_3$), and magnesium hydroxide ($Mg(OH)_2$). The metal hydroxide can decompose to release water and leave a metal oxide hydroxide and/or metal oxide nanostructure in the formed element. For example, aluminum hydroxide nanostructures can be included in the blend. Aluminum hydroxide decomposes at approximately 200° C. to form aluminum oxide hydroxide and/or aluminum oxide and water. Upon decomposition, the water can form bubbles in the blend and the aluminum oxide hydroxide and/or aluminum oxide can remain in the extrudate in the form of product high surface area nanostructures.

In general, the blowing agent can decompose to release water (at least in substantial amounts) at a temperature above the melting point of the fluid polymeric composition of the blend, said melting point being below the melting point of the polymeric particles of the blend. For example, the water release temperature of the blowing agent can be about 10° C. or more above the melting point of the polymeric composition, such as about 20° C., about 25° C., or about 30° C. above the melting point of the polymeric composition. The water release temperature of the blowing agent should also be low enough that such temperature is not detrimental to the polymeric composition of the blend or of the polymeric particles of the blend. As such, the blowing agent can be selected upon choosing the polymer of the polymeric composition and upon determining the melting point and the decomposition temperature of the polymeric composition and the melting point and the decomposition temperature of the polymeric particles.

In one embodiment, a sheet or other structure can be formed having a length and width dimension much greater than the thickness of the sheet. For example, a sheet can have a post-sintering thickness of from about 1 millimeter to about 20 millimeters, in one embodiment. In one embodiment, a tubular structure can be formed, e.g., a sheet in a tubular form.

The particulate material to be sintered may be placed in conjunction with other elements of a device, for instance a separation device, prior to sintering. For instance, the particulate material may be located adjacent to a frame, a flow line, or some other element of a device prior to sintering and the two elements can be bonded to one another in conjunction with the sintering of the polymeric particles.

The sintering can be carried out at an elevated temperature for a period of time either under pressure or at atmospheric pressure. In one embodiment, a compression mold can be utilized to form the sintered element. In this embodiment, following loading of the particulate material into the mold (optionally with other components in a blend), the mold and contents can be gradually heated to the sintering temperature and then optionally subjected to pressure while the individual particles are sintered to one another. When sintered under pressure, the pressure can generally range from about 30 MPa to about 150 MPa.

The element can be heated to a sintering temperature and held at that temperature for a period of time. The ramp-up rate to the sintering temperature can vary, for instance the ramp-up rate can be about 10° C./minute or less in some embodiments, or about 5° C./minute or less in some embodiments. The ramp up rate can also vary during a procedure. For instance, initial heating can be carried out at a relative quick rate, for instance, about 3° C./minute or greater, and final heating to the sintering temperature (e.g., about the last 50° C. or less) can be carried out at a slower rate, such as about 3° C./minute or less, about 2° C./minute or less, or about 1° C. per minute or less in some embodiments.

The sintering temperature can be, for example, from about 280° C. to about 360° C., with the time that the element is held at the sintering temperature varying depending upon the characteristics of the process as well as the element to be sintered. In general, the element can be held at the sintering temperature for a period of time from about 0 minutes (i.e., the element is heated to the sintering temperature and then immediately cooled) to about 6 hours. For instance, at a sintering temperature of about 300° C., the materials can be held at the sintering temperature for about one hour. At a lower temperature, for instance at about 290° C. sintering temperature, the materials can be held for a longer time period, for instance for about five hours for the sintering to be complete. Shorter hold times are also encompassed herein, for instance, the element can be held at the sintering temperature for a period of about 15 minutes, or less in some embodiments, for instance for about 5 minutes isothermal heating. As the sintering temperature increases the hold period can decrease to form the sintered separation element and vice versa.

Optionally, the element can be heated to a first, pre-cure temperature of from about 250° C. to about 275° C. and held for a period of time from about 0.5 hours to about 5 hours prior to continued heating of the element to the final sintering temperature. A pre-cure period can encourage initial bond formation between components of the element prior to the sintering process to be carried out between the polymeric particles.

Following sintering, the element is allowed to cool and removed from the mold (if necessary). The separation element can then be further processed for instance via cutting or otherwise shaping, polishing, coating, sterilizing, and/or combining with other components to provide a finished product.

FIG. 1 illustrates a cross-sectional geometry of a first filter element 12 and a second filter element 14 that are attached to one another via connections 16 to form a composite 10. The two filter elements 12, 14, may be separately formed and then attached to one another via adhering (e.g., with an adhesive), sintering (either during or following sintering of the individual filter elements 12, 14), welding (e.g., sonic welding), or any other manner. Accordingly, the connections 16 can be formed of the porous sintered material or a different material such as a polymeric adhesive. In FIG. 1, the two filter elements 12, 14 are arranged as mirror images of one another along their longitudinal axes with cells 18 there between. The connections 16 can provide support for the two filter elements 12, 14, and maintain strength and stiffness of a filtering apparatus. The individual filter elements 12, 14 can be formed in the final shape (in this embodiment a corrugated sheet-like formation) during sintering of the individual elements or following sintering.

Though illustrated in FIG. 1 in a corrugated sheet-like arrangement, it should be understood that the geometry of a separation element is in no way limited to the illustrated embodiments, and any suitable shape can be formed. For instance a predetermined separation element shape can be formed during sintering or following sintering, as desired. The sintered material can be shaped to form a block, cylinder, toroid, etc. for any particular application.

Following formation, a separation element can be further processed by shaping as well as other processes. In one embodiment a separation element can be coated on all or a portion of the element, for instance by use of a thermosetting resin, to provide additional stiffness to the element or to provide other desirable attributes to the separation element. For example, a cover can be formed on a portion of the separation element that can be formed of a hard polyolefin resin, a polyurethane, a polyvinyl chloride, etc.

Figure 2:
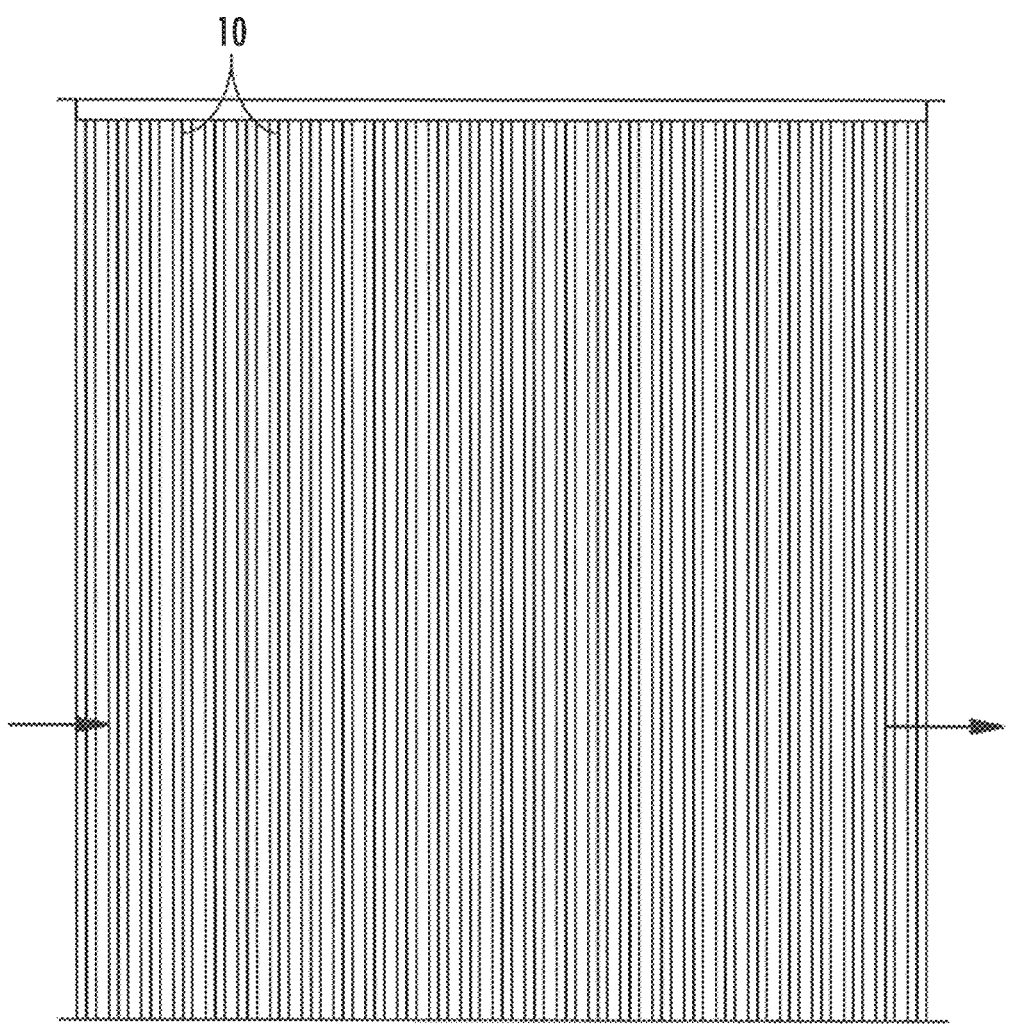
FIG. 2 illustrates a filtering apparatus including a plurality of filter elements.

A separation element can be combined with other components to form a separation apparatus. FIG. 2 illustrates one embodiment of a filtering apparatus that can incorporate a plurality of filter elements. By way of example, a plurality of composite filter elements 10 as illustrated in FIG. 1 can be combined to form the filtering apparatus of FIG. 2. During use the fluid to be filtered can flow as indicated by the directional arrows from the unfiltered gas side of the filtering apparatus through the multiple composite filter elements 10 and to the clean gas side of the filtering apparatus. The unfiltered side and the clean side of the filtering apparatus are generally separated by a partition in the filter apparatus that includes the filter elements. Usually, there are provided multiple filter elements one after another as shown such that the longitudinal axes of the filter elements are disposed substantially parallel to each other with their major plane of extension and with spacing from each other.

Multiple filter elements of a single filtration apparatus can have different porosities. For instance, a first filter element can be combined with a second filter element that has larger pores. The combined porosities of the two (or more) filter elements can increase the filtration capabilities of a system. By way of example, a high temperature flow can encounter multiple filter elements with decreasing pore sizes to remove multiple materials from a stream.

Filter elements can be beneficially utilized in high temperature filtration processes such as exhaust systems, boilers, incinerators, etc. Particular applications can include power plants, pigment manufacturing, and so forth, for example in flue gas filtration processes. High temperature filtration processes can also encompass food, beverage, and pharmaceutical preparation applications.

The separation elements are not limited to filtration application and can encompass gas/gas separations as well as in high temperature catalysts beds and desiccant beds. For instance, a separation element can include secondary materials such as a zeolite, activated carbon, or carbon molecular sieves, as discussed above, and the separation element can target particular compounds for removal from a high temperature fluid stream.

Figure 3A:
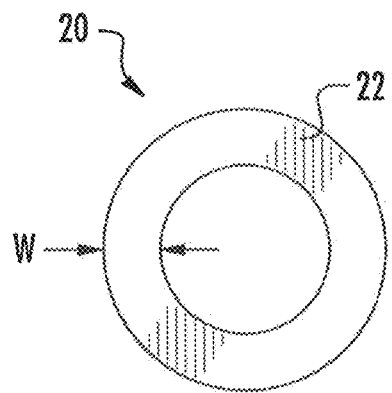
FIG. 3 illustrates a porous element in the shape of a tubular structure.
Figure 3B:
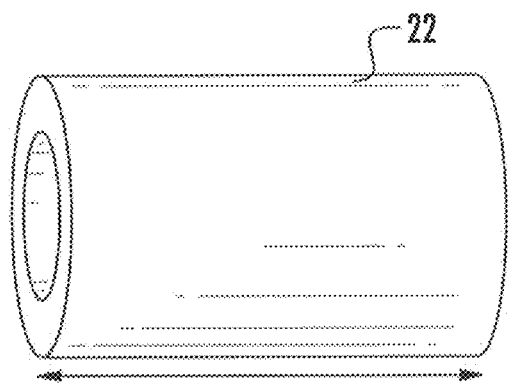

FIG. 3 illustrates a porous sintered element formed as a tubular structure 20 including a cross-sectional view in FIG. 3A and a perspective view in FIG. 3B. In this embodiment, the wall 22 of the tubular structure 20 can be formed by the porous sintered material across the entire width w and length l of the structure 20. Of course, in other embodiments, the porous material can be combined with other materials, such as a liner on the inner and/or outer surface of the tubular structure, or over a portion of the tubular structure.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Tensile Properties: Tensile properties including tensile modulus, yield stress, yield strain, break stress, break strain, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Pore size/Porosity: Average pore size and porosity were determined according to DIN 66 133 testing protocol. This method is based on the intrusion of mercury as a non-wetting liquid into a solid and porous material under pressure. Depending on pore size a specific pressure has to be applied in order to push mercury into the pores against the opposing force of the mercury's surface tension. By registration of the needed pressure pore size and porosity can be calculated via the Washburn equation.

Particle Size and Particle Size Distribution: Particle size analysis was carried out via Laser Diffraction of Sample Particles. Before analysis, a water basin was cleaned out thoroughly before running new samples. The instrument was allowed to auto rinse for a couple of minutes. Standard Operating Method (SOM) needs to be set up pertaining to specific sample being run.

Standard Operation Method (SOM): PIDS (Polarization Intensity Differential Scattering) was activated to calculate particle sizes from 0.017 μm to 2,000 μm. Sample name, density, and refractive index were entered (water's refractive index taken into account in method). Instrument Alignment and Offsets were measured. A background was run with every sample (if background was too large, the system was cleaned). Sample was loaded into the water basin (small amount of Neutral Dispersant was used if sample did not mix well into the water basin). Results were collected after the method completed 3 (90) second runs. Of the three runs, the largest distribution was chosen to report as the particle size (largest size case scenario). If there was a large discrepancy or inconsistent trend between the runs, the sample was run again to verify previous results.

Pressure Drop: Pressure drop values were measured using a sample of the porous article having a diameter of 140 mm, a thickness of 6.2-6.5 mm and an airflow rate of 7.5 m³/hour by measuring the drop in pressure across the width of the sample.

Complex viscosity: Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with a strain amplitude of 3%. The gap distance was kept at 1.5 mm for pellet samples. The temperature was set at 310° C. for all samples.

Melting and Crystallization Temperatures: The melting temperature ("Tm") and crystallization temperature ("Tc") were determined by differential scanning calorimetry ("DSC") as is known in the art. The melting temperature is the differential scanning calorimetry (DSC) peak melt temperature as determined by ISO Test No. 11357. The crystallization temperature is determined from the cooling exotherm in the cooling cycle. Under the DSC procedure, samples were heated and cooled at 10° C. per minute as stated in ISO Standard 10350 using DSC measurements conducted on a TA Q2000 Instrument.

Shrinkage: The part shrinkage during sintering was obtained by measuring the diameter of the final piece. If L1 is the diameter of the mold and L2 is the diameter of the final piece, then % shrinkage=(L1−L2)/L1×100. The shrinkage values were obtained for each side (top and bottom) of the mold. Dissimilar shrinkage values at the top and bottom of the piece indicates warpage of the part.

Example 1

Polymeric materials were cryogenically ground, sieved, examined for particle size distribution. Samples included a comparative sample formed of ultra-high molecular weight polyethylene (GUR® available from Ticona Engineering Polymers of Florence, Kentucky) and experimental samples formed of polypropylene sulfide (Fortron® available from Ticona Engineering Polymers of Florence, Kentucky).

Particle samples included the following:

|  | $d_{10}$ (μm) | $d_{25}$ (μm) | $d_{50}$ (μm) | $d_{75}$ (μm) | $d_{90}$ (μm) |
| --- | --- | --- | --- | --- | --- |
| Particle Sample 1 | 92.92 | 165.6 | 256.8 | 353.9 | 450.2 |
| Particle Sample 2 | 103.0 | 184.9 | 300.2 | 419.3 | 521.0 |
| Particle Sample 3 | 35.11 | 50.72 | 69.01 | 90.19 | 111.3 |

Figure 4:
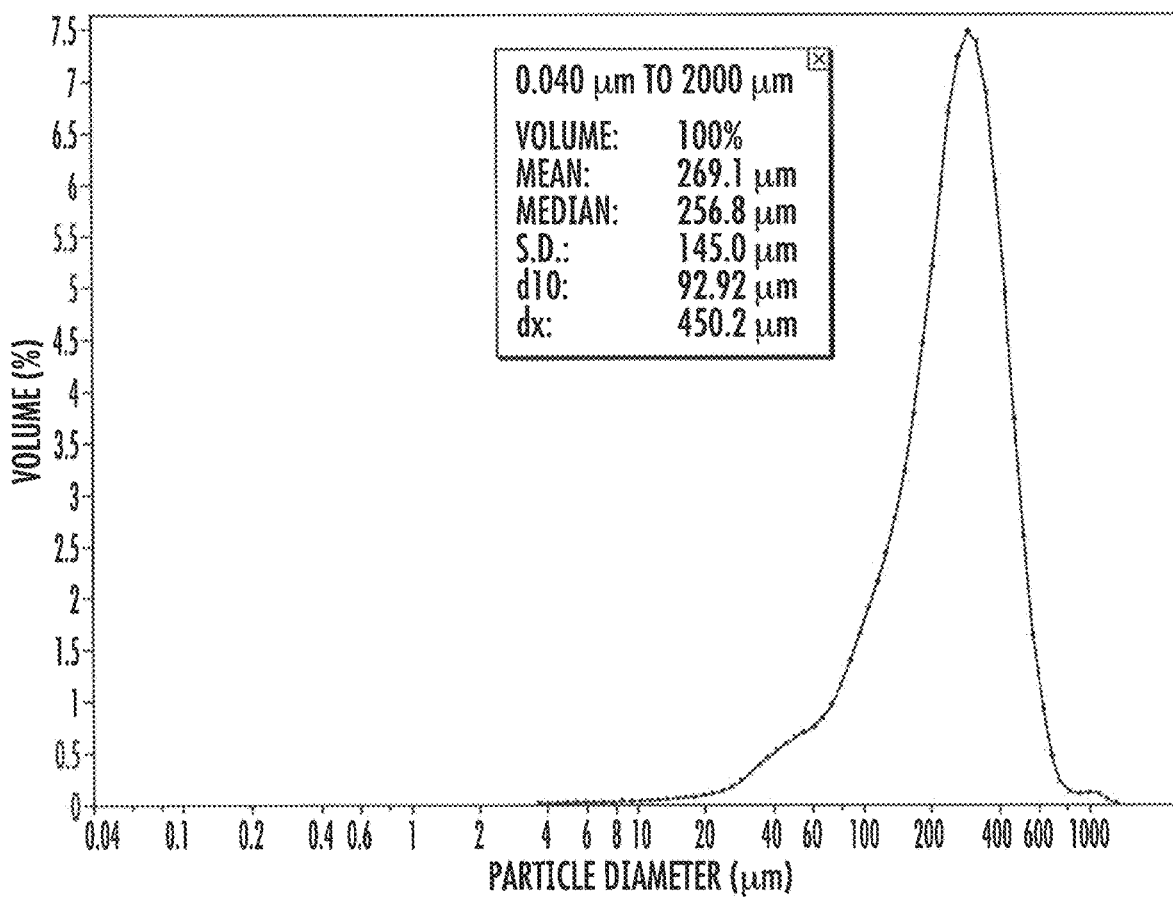
FIG. 4 illustrates the particle size distribution of polymeric particles formed of a thermoplastic composition that includes a polyarylene sulfide.

FIG. 4 illustrates the particle size distribution of Particle Sample 1. As can be seen, the sample has a narrow size distribution.

The particle samples were then poured into a mold and compressed by shaking or application of a compressive force. The mold described a 160 millimeter diameter and a 6 millimeter depth. The mold was then gradually heated to a sintering temperature and held at that temperature for a period of time as indicated with or without the application of pressure. The mold was then cooled and the sintered article in the form of a disc was released. Formation methods and particle samples used for each sintered article were as follows:

|  | Particle Sample | Compressive Force | Sintering Temperature (° C.) | Sintering Time |
| --- | --- | --- | --- | --- |
| Comparative Sintered Article | Comparative Sample | Atmosphere | 220 | 1.5 h |
| Sintered Article 1 | Particle Sample 1 | Atmosphere | 300 | 4 h |
| Sintered Article 2 | Particle Sample 1 | Atmosphere | 297 | 12 h |
| Sintered Article 3 | Particle Sample 1 | ~2 MPa | 297 | 1.5 h |
| Sintered Article 4 | Particle Sample 2 | Atmosphere | 300 | 4 h |
| Sintered Article 5 | Particle Sample 3 | Atmosphere | 295 | 3 h |

Figure 5:
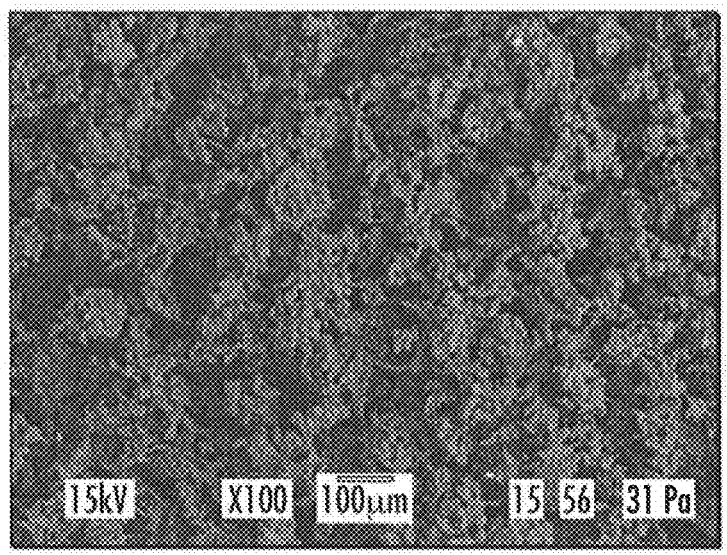
FIG. 5 is a scanning electron micrograph (SEM) of the surface of a sintered article formed from a comparative polymer.
Figure 6A:
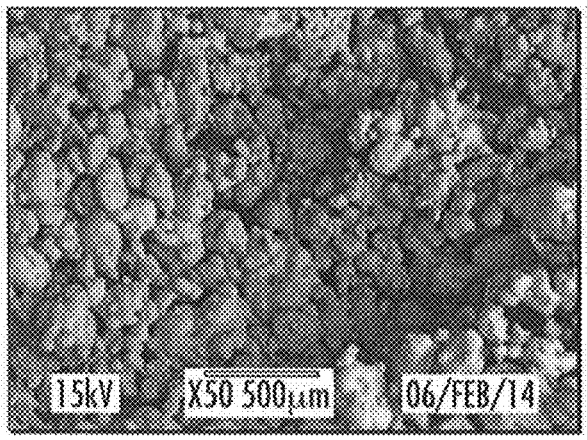
FIG. 6A is an SEM of a cross-section of a sintered article described herein.
Figure 6B:
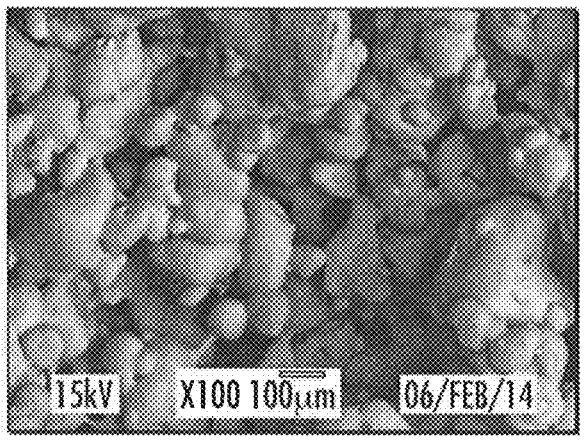
FIG. 6B is an SEM of the surface of the article of FIG. 6A.
Figure 7:
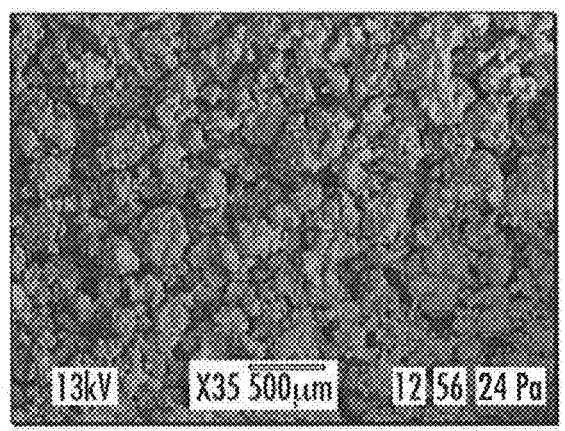
FIG. 7 is an SEM of the surface of another sintered article.
Figure 8:
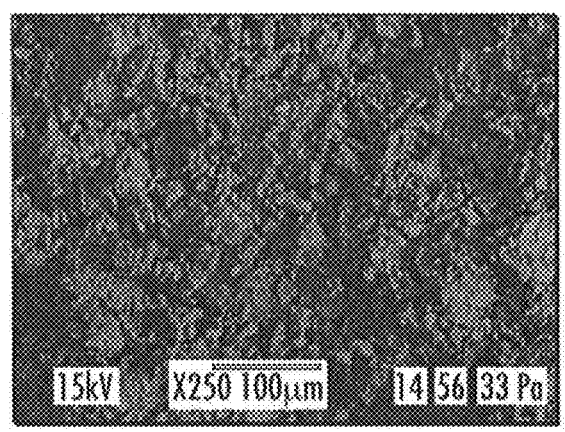
FIG. 8 is an SEM of the surface of another sintered article.
Figure 9A:
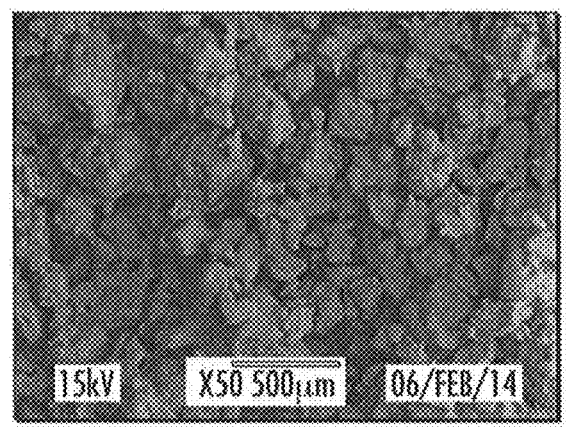
FIG. 9A is an SEM of a cross-section of another sintered article.
Figure 9B:
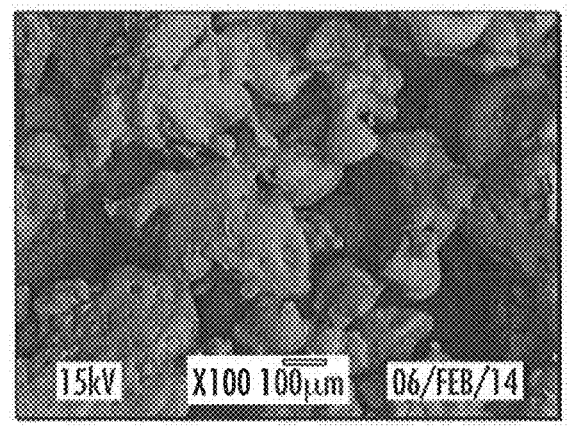
FIG. 9B is an SEM of the surface of the sintered article of FIG. 8.

The sintered articles were examined for a variety of physical characteristics. FIG. 5 is a scanning electron micrograph (SEM) of the surface of the Comparative Sintered Article. FIG. 6A and FIG. 6B illustrate SEMs of Sintered Article 1 in cross-section (FIG. 6A) and surface (FIG. 6B). FIG. 7 is an SEM of the surface of Sintered Article 2. FIG. 8 is an SEM of the surface of Sintered Article 3. FIG. 9A and FIG. 9B are SEMs of Sintered Article 4 in cross-section (FIG. 9A) and surface (FIG. 9B). Other characteristics are provided in the table, below.

|  | Comp. Sample | Sint. Art. 1 | Sint. Art. 2 | Sint. Art. 3 | Sint. Art. 4 | Sint. Art. 5 |
| --- | --- | --- | --- | --- | --- | --- |
| Pressure Drop (mbar) | 20 | — | — | — | 2 | 48 |
| Pore Size (ave. μm) | 33 | 120 | 63.8 | 8 | 127 | 30 |
| Porosity (%) | 40 | 48 | 45.6 | 35.9 | 48 | 44 |
| Tensile Breaking Strength (MPa) | 1.96 | 2.77 | brittle | Brittle | 2.15 | 3.68 |
| Tensile Elongation at Break (%) | 15.8 | 1.6 | brittle | Brittle | 1.1 | 0.8 |
| Tensile Modulus (MPa) | 34.2 | 270 | brittle | Brittle- | 281 | 476 |

Example 2

Polymeric materials were processed according to either cryogenic grinding or flash crystallization to form polymeric particles. Samples included polyphenylene sulfide (PPS) (various Fortron® grades available from Ticona Engineering Polymers of Florence, Kentucky), optionally in conjunction with an impact modifier. Certain samples were heat treated prior to sintering. Sample characteristics are provided in the table, below.

| Particle Sample No. | Components | Particle size (μm, $d_{50}$) | Formation method |
|---|---|---|---|
| 4 | PPS | ~100 | Cryogenic grinding |
| 5 | PPS | ~100 | Cryogenic grinding |
| 6 | PPS | ~100 | Cryogenic grinding followed by heat treatment at 255° C. for 2 hrs. (atm.) |
| 7 | PPS | ~100 | Cryogenic grinding followed by heat treatment at 255° C. for 3 hrs. (atm.) |
| 8 | PPS with impact modifier | ~150 | Flash Crystallization |

Figure 10:
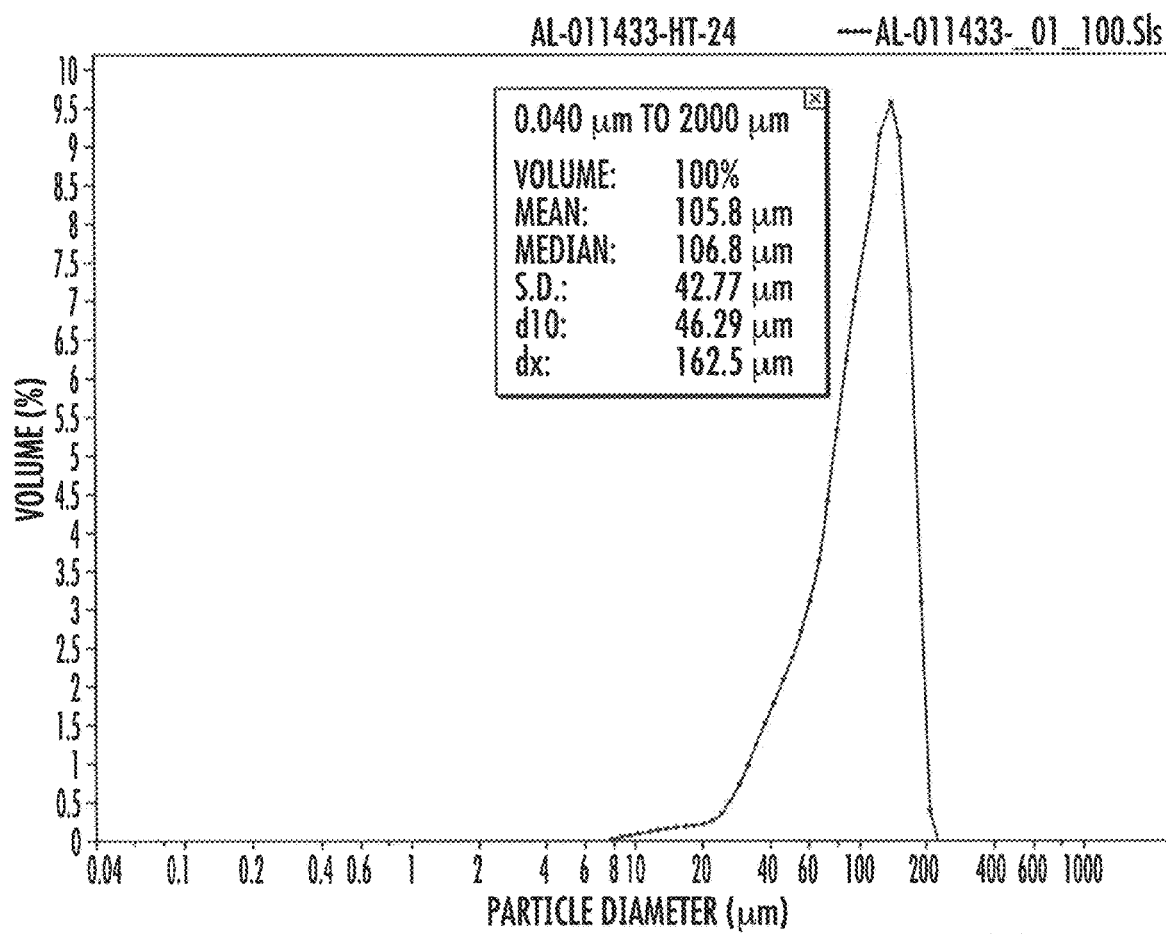
FIG. 10 illustrates the particle size distribution of polymeric particles formed of a thermoplastic composition that includes a polyarylene sulfide.

FIG. 10 illustrates the particle size distribution for sample no. 4. The characteristics of the sample were as follows:

| | |
|---|---|
| mean | 105.8 μm |
| median | 106.8 μm |
| standard deviation | 42.77 μm |
| mean/median | 0.991 |
| variance | 1829 μm² |
| C.V. | 40.4% |
| Mode | 140.1 μm |
| Skewness | −0.075 left skewed |
| Kurtosis | −0.825 platykurtic |
| $d_{10}$ | 46.29 μm |
| $d_{25}$ | 73.32 μm |
| $d_{50}$ | 106.8 μm |
| $d_{75}$ | 139.6 μm |
| $d_{90}$ | 162.5 μm |

Figure 11A:
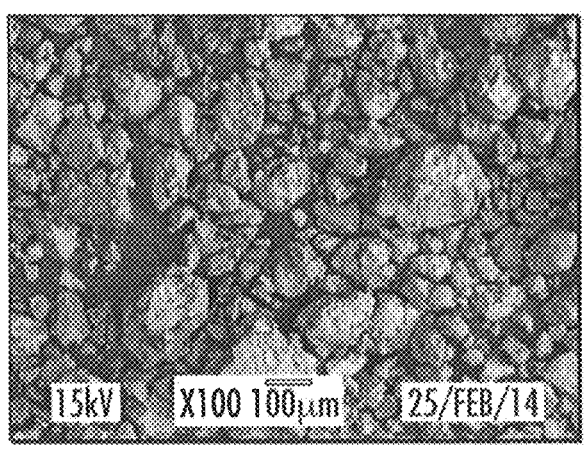
FIG. 11A illustrates particles of the distribution of FIG. 10.
Figure 11B:
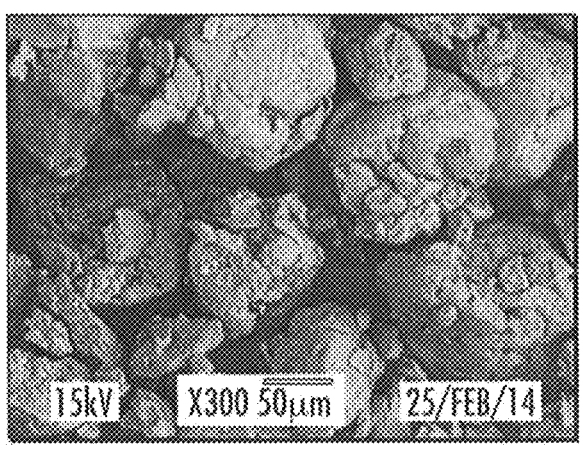
FIG. 11B illustrates an increased magnification of particles of the distribution of FIG. 10.

FIG. 11A and FIG. 11B present SEMs of increasing magnification of particles of sample 4.

Figure 12:
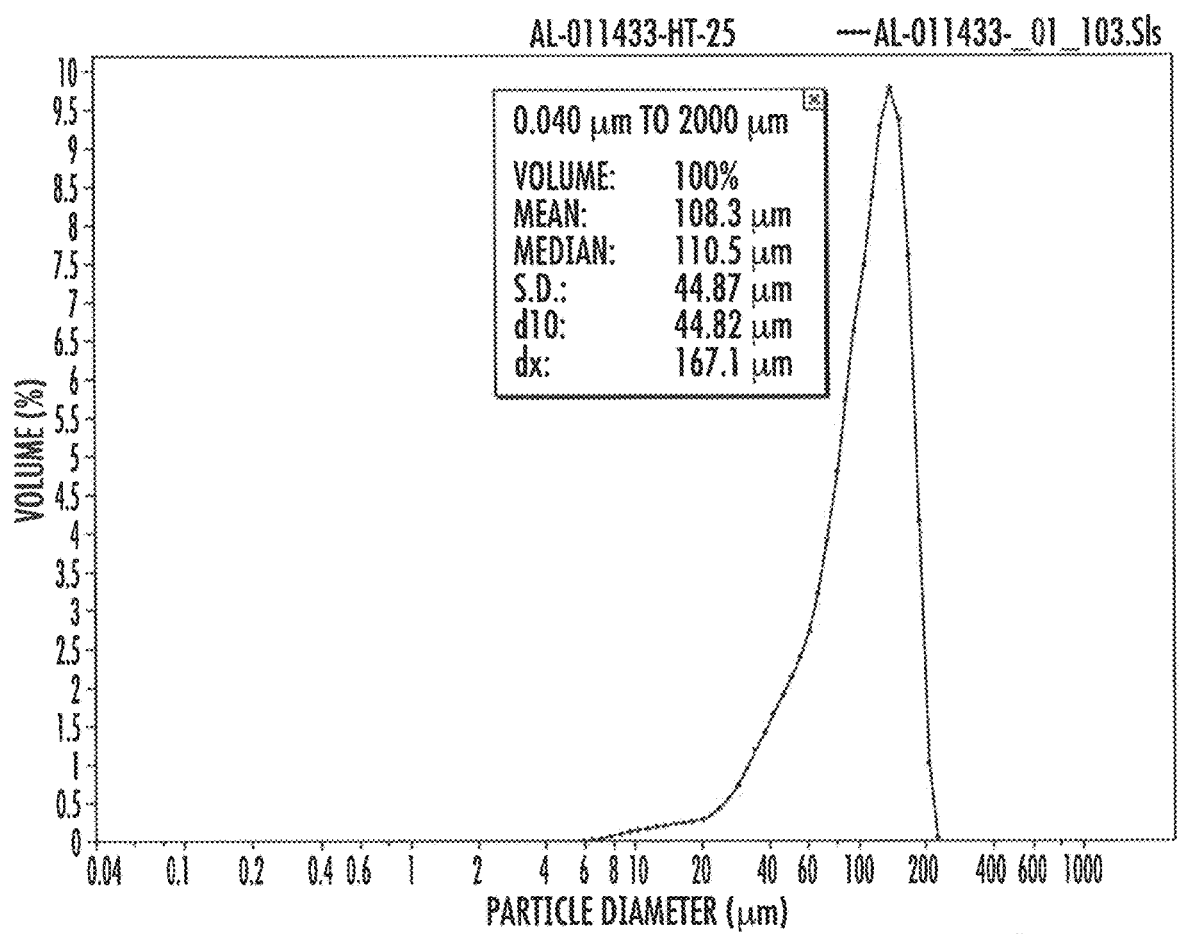
FIG. 12 illustrates the particle size distribution of polymeric particles formed of a thermoplastic composition that includes a polyarylene sulfide.

FIG. 12 illustrates the particle size distribution for sample no. 5. The characteristics of the sample were as follows:

| | |
|---|---|
| mean | 108.3 μm |
| median | 110.5 μm |
| standard deviation | 44.87 μm |
| mean/median | 0.980 |
| variance | 2014 μm² |
| C.V. | 41.4% |
| Mode | 140.1 μm |
| Skewness | −0.131 left skewed |
| Kurtosis | −0.759 platykurtic |
| $d_{10}$ | 44.82 μm |
| $d_{25}$ | 75.12 μm |
| $d_{50}$ | 110.5 μm |
| $d_{75}$ | 143.1 μm |
| $d_{90}$ | 167.1 μm |

Figure 13A:
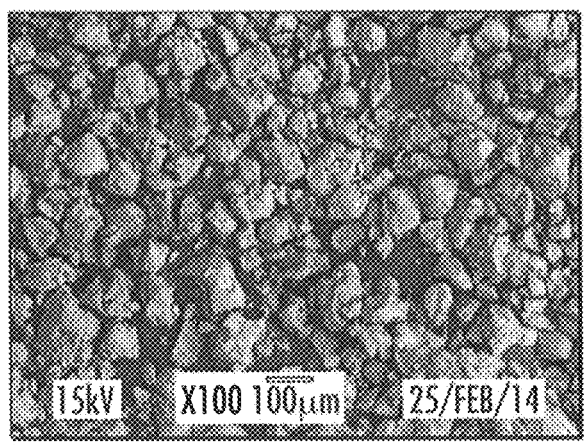
FIG. 13A illustrates particles of the distribution of FIG. 12.
Figure 13B:
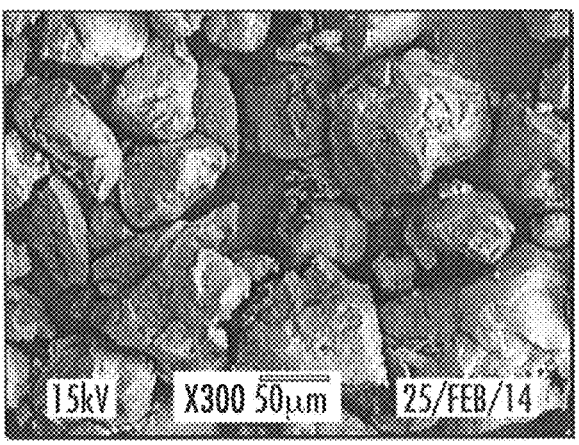
FIG. 13B illustrates an increased magnification of particles of the distribution of FIG. 12.

FIG. 13A and FIG. 13B present SEMs of increasing magnification of particles of sample 5.

Figure 14:
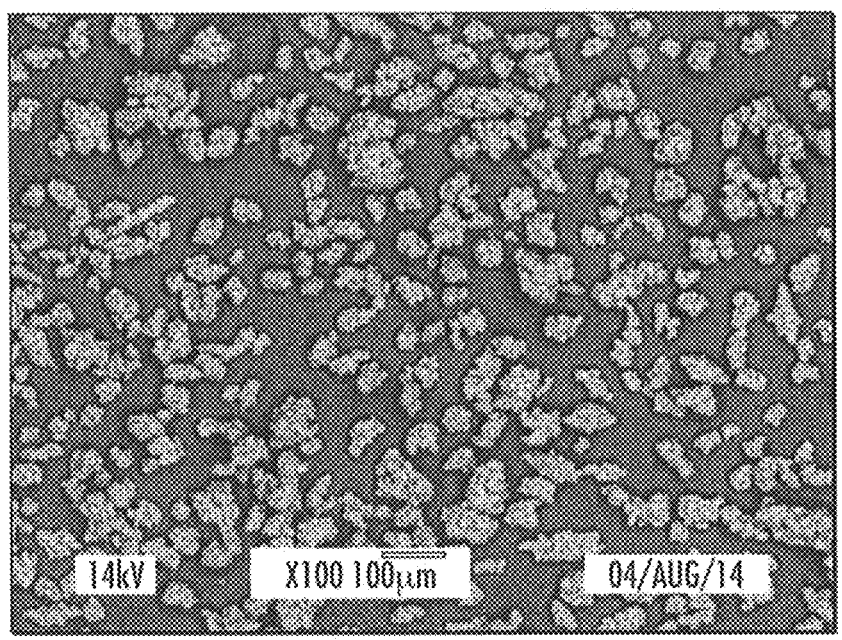
FIG. 14 illustrates particles formed of a thermoplastic composition that includes a polyarylene sulfide.

FIG. 14 is an SEM of particles of sample no. 8 formed according to a flash crystallization method. The average particle size was about 150 μm.

Figure 15:
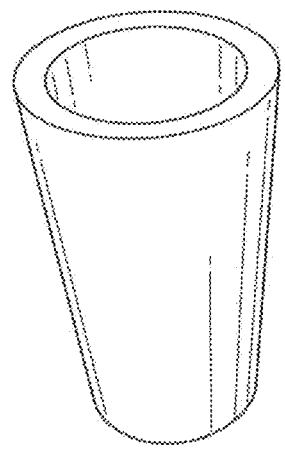
FIG. 15 illustrates a sintered porous tube formed of particles of a thermoplastic composition that includes a polyarylene sulfide.

Prototypes including a tube (FIG. 15) and a cake (FIG. 16) were sintered from particles of sample no. 6. The tube of FIG. 15 was sintered at 300° C. for 1 hour. The outer diameter of the tube was 50 mm, the height of the tube was 100 mm and the wall thickness was about 6 mm. The cake of FIG. 16 was sintered at 300° C. for 1 hour. The diameter of the cake was 150 mm and the thickness was about 6 mm.

Figure 16:
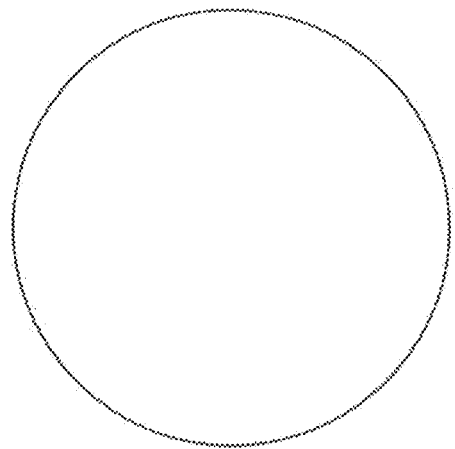
FIG. 16 illustrates a sintered cake formed of particles of a thermoplastic composition that includes a polyarylene sulfide.
Figure 17A:
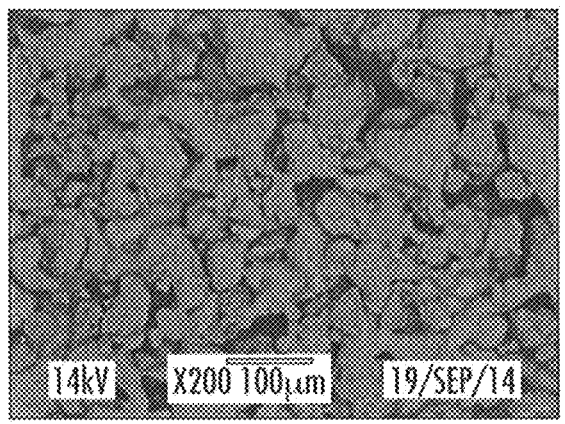
FIG. 17A illustrates the surface morphology of the sintered cake of FIG. 16.
Figure 17B:
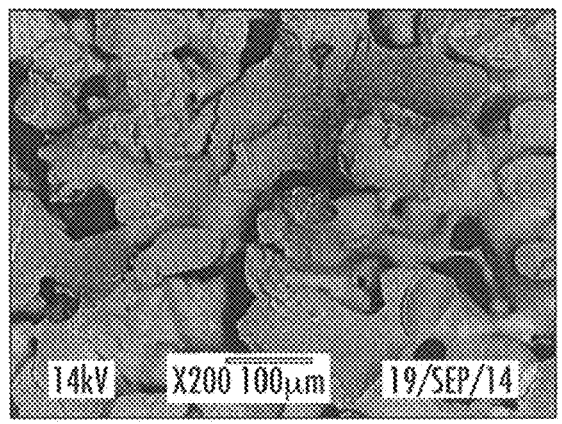
FIG. 17B illustrates the cross-section morphology of the sintered cake of FIG. 16.

FIG. 17A illustrates the surface morphology of the cake of FIG. 16 and FIG. 17B illustrates the cross-section morphology of the cake of FIG. 16.

Figure 18:
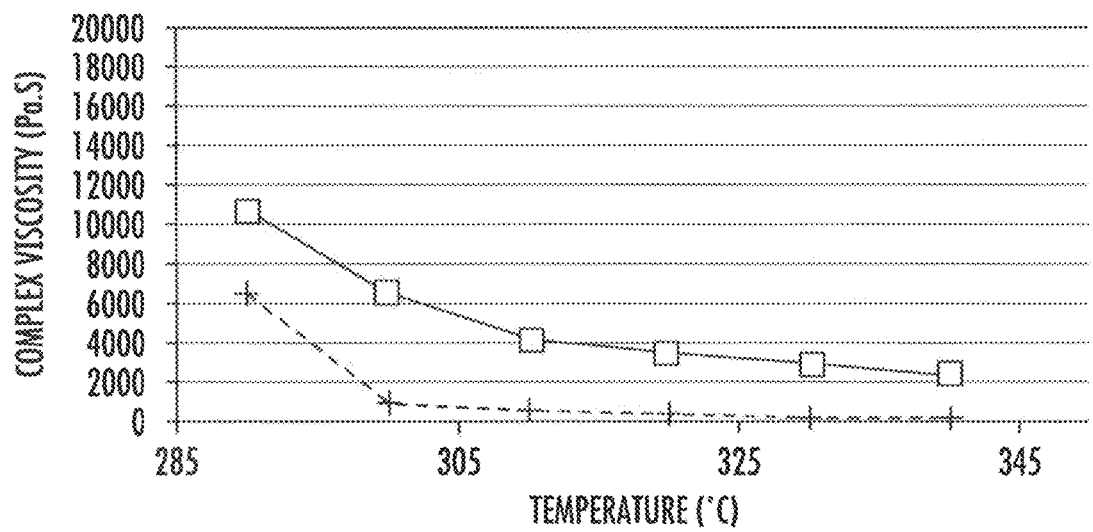
FIG. 18 graphically illustrates the change in complex viscosity with temperature for a thermoplastic composition used to form polymeric particles as described herein.

The heat treatment prior to sintering that was carried out on samples 6 and 7 increased the melt viscosity of the composition. FIG. 18 presents a graph of complex viscosity vs. temperature for a polyphenylene sulfide following heat treatment at 255° C. for 2 hours (dark lines and squares) and for a similar polyarylene sulfide with no heat treatment. As can be seen, the complex viscosity of the heat treated polymer remains higher over the temperature range.

Sample nos. 4 and 6 were formed of the same thermoplastic compositions, with the only difference being a heat treatment for sample no. 6 and no heat treatment for sample no. 4. The characteristics of the two samples were determined and presented in the table below.

| Property | Sample No. 4 | Sample No. 6 |
|---|---|---|
| Melting point ($T_{m1}$) (° C.) | 295.57 | 298.16 |
| % Cryst. $1^{st}$ heat (%) | 53 | 54.68 |
| Melting Point ($T_{m2}$) | 274.81 | 273.92 |
| % Cryst. $2^{nd}$ heat (%) | 33.6 | 27.06 |
| Particle size $d_{50}$ (μm) | 106 | 106 |
| Complex viscosity (Pa-s) | 477 | 4070 |

Sintered cakes as illustrated in FIG. 16 were formed from the particles of sample no. 4 and sample no. 6. The cake of sample no. 4 particles was sintered at a temperature of 295° C. at atmospheric pressure for a period of 45 minutes. The cake of sample no. 6 particles was sintered at a temperature of 300° C. at atmospheric pressure for a period of 1 hour. The physical characteristics of the cakes are provided in the table below.

| | Sample No. 4 | Sample No. 6 |
|---|---|---|
| Particle size $d_{50}$ (μm) | 106 | 106 |
| Thickness (mm) | 4.92 | 4.85 |
| Pressure drop (mbar) | 37 | 28 |
| Avg. pore size (μm) | 45.3 | 37.3 |
| Porosity (%) | 21.4 | 45.2 |
| Breaking strength (MPa) | 4.48 | 12.71 |
| Elongation at break (%) | 1.1 | 1.1 |
| Shrinkage (%) | 5-8 | 3-6 |

As can be seen, the cake formed with the heat treated particles exhibits lower shrinkage and increased porosity and break strength as well as decreased pressure drop across the cake.

Example 3

Different thermoplastic compositions were formed including polyphenylene sulfide (PPS) (various Fortron® grades available from Ticona Engineering Polymers of Florence, Kentucky), an impact modifier (Lotador® available from Arkema), a zinc stearate crosslinking agent, and a lubricant (Glycolube® available from Lonza). Specific formulations are provided in the table below with values provided as weight percent of the composition.

| Sample No. | PPS | Impact modifier | Crosslinking agent | lubricant |
|---|---|---|---|---|
| 9 | 84.7 | 15 | 0.0 | 0.3 |
| 10 | 100 | 0.0 | 0.0 | 0.0 |
| 11 | 96.7 | 3 | 0.0 | 0.3 |
| 12 | 94.7 | 5 | 0.0 | 0.3 |
| 13 | 94.6 | 5 | 0.1 | 0.3 |

Particles were formed from the thermoplastic compositions through grinding pellets or flakes of the compounded thermoplastic composition. The table below provides the particle size distribution of the formed particles.

| Sample No. | $d_{10}$ (μm) | $d_{25}$ (μm) | $d_{50}$ (μm) | $d_{75}$ (μm) | $d_{90}$ (μm) |
|---|---|---|---|---|---|
| 9 | 189.4 | 284.8 | 390.8 | 500.6 | 607.1 |
| 10 | 51.29 | 82.71 | 120.7 | 167.4 | 224.8 |
| 11 | 146.4 | 205.6 | 291.9 | 403.1 | 532.7 |
| 12 | 146.4 | 207.2 | 293.1 | 400.7 | 522.1 |
| 13 | 151.4 | 214.8 | 300.5 | 403.5 | 514.7 |

Following formation, powders were poured and packed into a circular mold with a diameter of 17 centimeters and a thickness of 0.6 centimeters. Each sample number was utilized to form several different molds. The packed mold was placed in a box muffle furnace and heated to sinter the particles. The temperature of the mold was measured by attaching plate thermocouples to the top and bottom surface of the mold. The mold temperature was ramped to the maximum temperatures indicated in the table below. The ramp rate was 4° C. per minute until reaching 30° C. below the maximum temperature. The temperature ramp rate was 0.5° C. per minute in the last 30° C. of the temperature profile. The powder was sintered for 5 minutes isothermally at the maximum temperature as indicated and cooled to room temperature.

| Mold Sample/Sample No. of formation | Max. top temperature (° C.) | Max. bottom temperature (° C.) |
|---|---|---|
| A/10 | 292.5 | 291.6 |
| B/10 | 297 | 296.6 |
| C/10 | 299.3 | 298.6 |
| D/10 | 301.2 | 300.4 |
| E/10 | 304.4 | 303.7 |
| F/10 | 320.4 | 319.6 |
| G/11 | 303.5 | 302.8 |
| H/11 | 321.7 | 320.8 |
| I/12 | 303.9 | 303.4 |
| J/12 | 321.5 | 320.6 |
| K/13 | 303.6 | 302.8 |
| L/13 | 321.6 | 321.3 |
| M/9 | 288.3 | 286.6 |
| N/9 | 291.9 | 290.4 |
| O/9 | 304.7 | 303.6 |
| P/9 | 321.6 | 320.6 |
| Q/9 | 338.6 | 338.4 |

Appearance and physical characteristics for each of the mold samples was determined. Results are provided in the table below.

| Mold Sample/Sample No. of formation | Shrink. top (%) | Shrink. bottom (%) | Appearance | Tensile Mod. (MPa) | Break Strain (%) | Break Stress (MPa) |
|---|---|---|---|---|---|---|
| A/10 | — | — | All dust | — | — | — |
| B/10 | 1.2 | 1.2 | Dusty, easy to crush | — | — | — |
| D/10 | 2.4 | 1.8 | Good, slight warpage | 147 | 1.1 | 1.19 |
| D/10 | 3.5 | 2.4 | Good, slight warpage | 357 | 1.5 | 3.83 |
| E/10 | 5.9 | 4.7 | Warped, partially melted | 2069 | 1.4 | 25.66 |
| F/10 | 2.4 | 2.4 | Melted | 3229 | 3.4 | 70.52 |
| G/11 | 1.8 | 1.8 | Good | 839 | 0.7 | 5.41 |
| H/11 | 1.2 | 1.2 | Melted | — | — | — |
| I/12 | 1.8 | 1.8 | Good | 594 | 0.6 | 3.03 |
| J/12 | 1.2 | 1.2 | Melted | — | — | — |
| K/13 | 2.4 | 2.4 | Good | 706 | 0.9 | 5.14 |
| L/13 | 2.4 | 2.4 | Melted, not porous | — | — | — |
| M/9 | 3.5 | 3.5 | Dusty | — | — | — |
| N/9 | 2.5 | 3.5 | Dusty | — | — | — |
| O/9 | 2.4 | 2.4 | Good | 182 | 0.8 | 1.23 |
| P/9 | 2.4 | 2.4 | Good | 354 | 1.4 | 3.23 |
| Q/9 | 1.2 | 1.2 | Good | 400 | 1.5 | 3.72 |

The visual appearance of the molded samples were classified into four categories:
1) Dusty: The sintered powder fell apart when a weak force was applied with a hand.
2) Good: The molded part looked symmetric from the top and bottom with no warpage, especially at the corners. The part was porous and no eminent melting noticed.
3) Partially melted, warped: Locally melted powder flowed into voids between particles when the powder partially melted. The thickness of the piece is low. A different shrinkage was measure at the top and bottom of the piece, which is also a reason for warpage especially at the corners of the piece. Air did not penetrate the piece.
4) Melted: The piece looked like an injection molded part—the powder melted completely.

Figure 19:
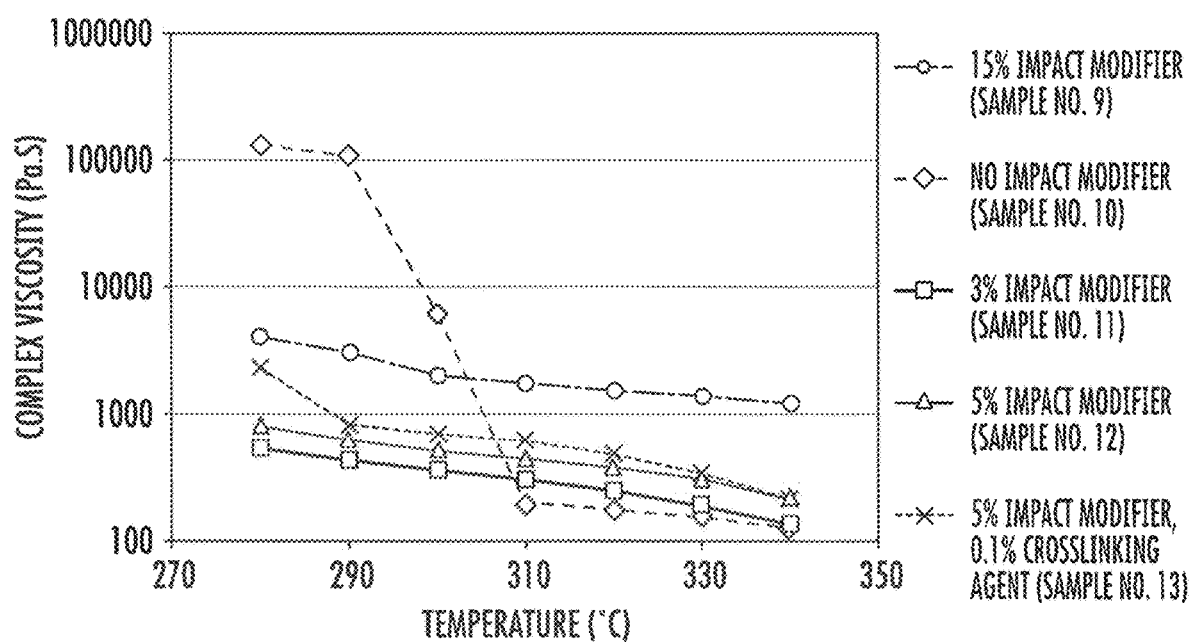
FIG. 19 illustrates the change in complex viscosity with temperature for several different thermoplastic compositions.

The inclusion of an impact modifier with the polyarylene sulfide can increase the melt viscosity of the thermoplastic composition that forms the polymer particles. FIG. 19 presents the variation of complex viscosity with temperature for the samples including no impact modifier (sample no. 10), 3 wt. % impact modifier (sample no. 11), 5 wt. % impact modifier (sample no. 12, sample no. 13), and 15 wt. % impact modifier (sample no. 9). As shown, increasing amounts of impact modifier will increase the complex viscosity of the composition.

Figure 20:
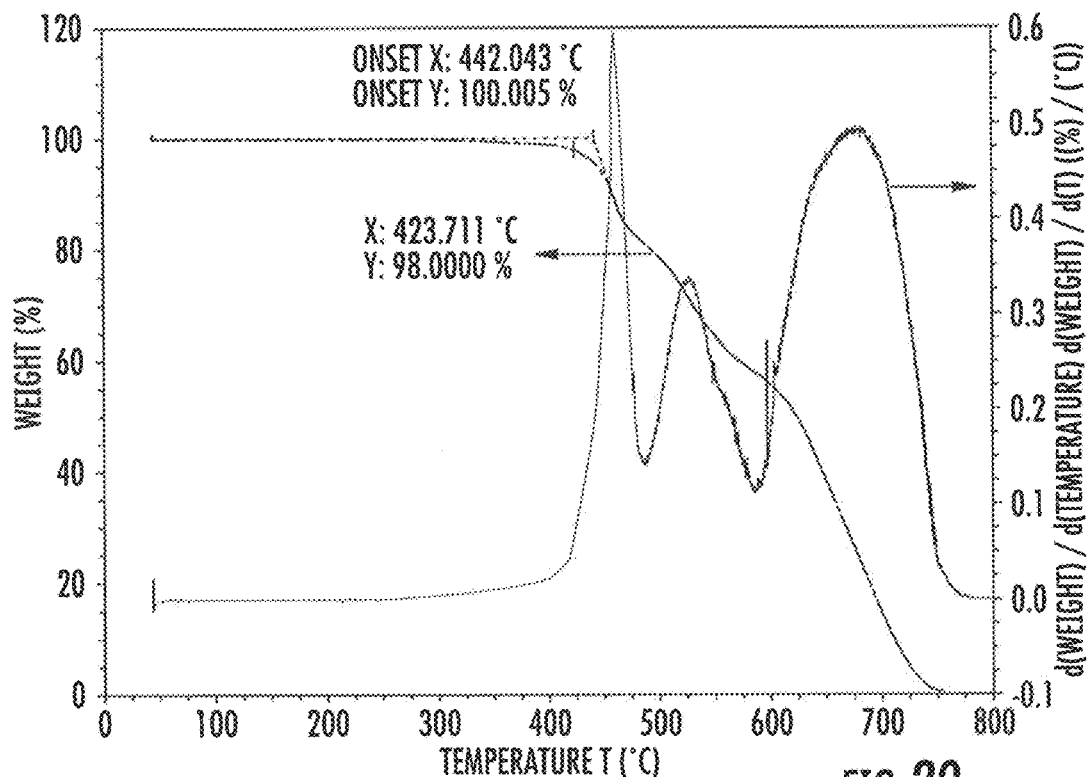
FIG. 20 illustrates the degradation temperature for a thermoplastic composition as may be used in forming sintered products as disclosed herein.

FIG. 20 presents the degradation temperature of the thermoplastic composition including 15 wt. % impact modifier (sample no. 9). As can be seen, the degradation temperature is greater than 400° C., which is higher than the sintering temperatures that can be used in forming the products.

Figure 21:
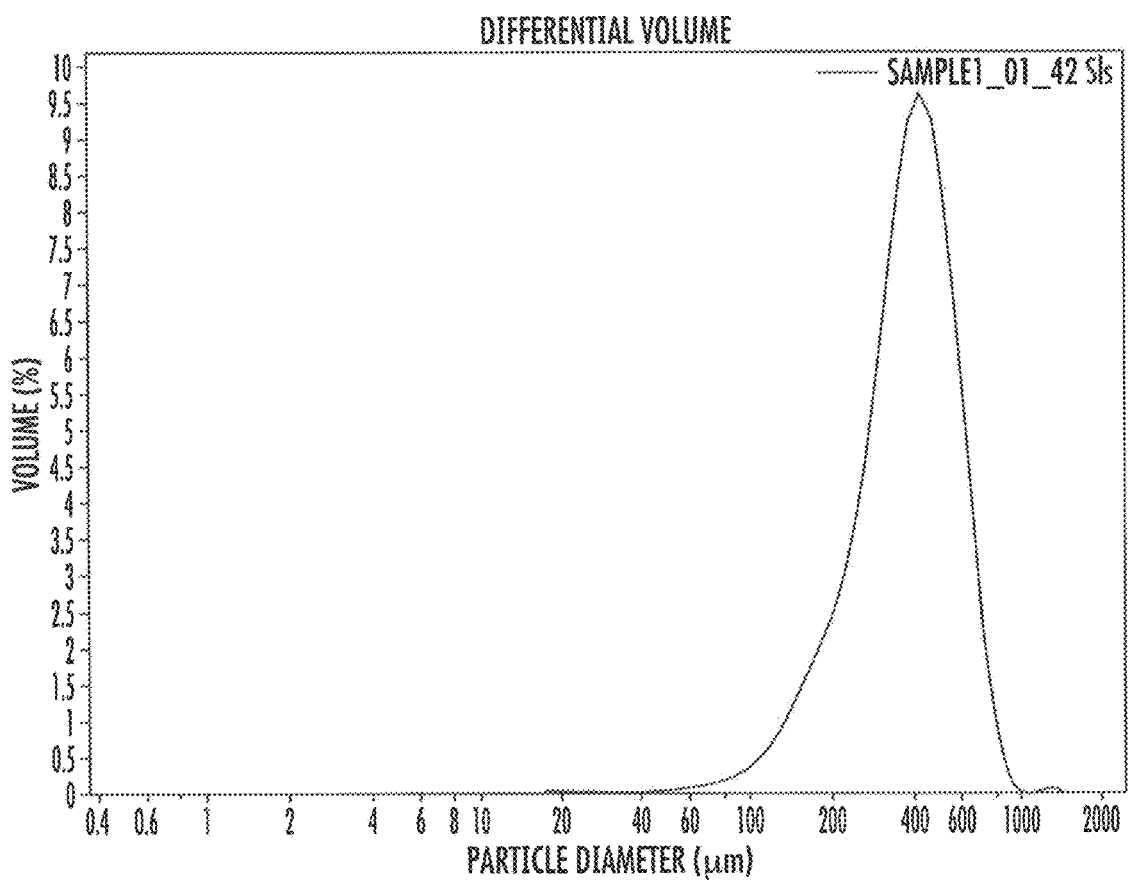
FIG. 21 illustrates the particle size distribution of polymeric particles formed of a thermoplastic composition that includes a polyarylene sulfide.

FIG. 21 illustrates the particle size distribution for sample no. 9 formed with 15 wt. % impact modifier. The characteristics of the sample were as follows:

| | |
|---|---|
| mean | 396.8 μm |
| median | 390.8 μm |
| standard deviation | 163.3 μm |
| mean/median | 1.016 |
| variance | 26678 μm$^2$ |

-continued

| | |
|---|---|
| C.V. | 41.2% |
| Mode | 429.2 μm |
| Skewness | 0.456 right skewed |
| Kurtosis | 1.140 leptokurtic |
| $d_{10}$ | 189.4 μm |
| $d_{25}$ | 284.8 μm |
| $d_{50}$ | 390.8 μm |
| $d_{75}$ | 500.6 μm |
| $d_{90}$ | 607.1 μm |

Figure 22A:
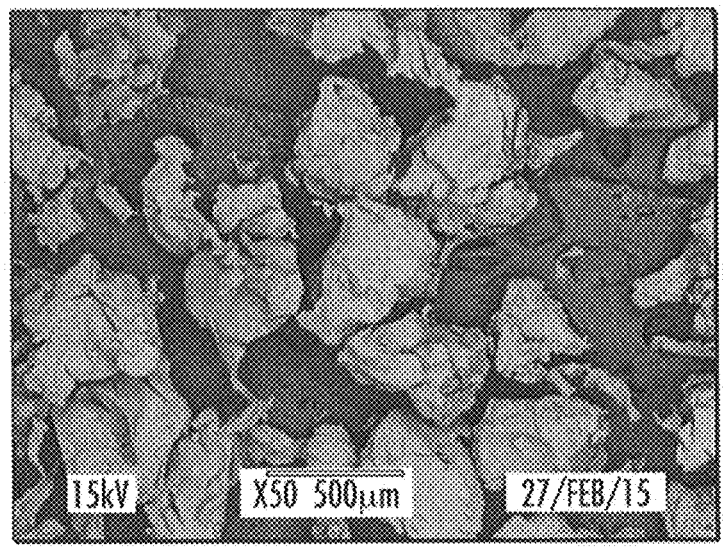
FIG. 22A illustrates particles of the distribution of FIG. 21.
Figure 22B:
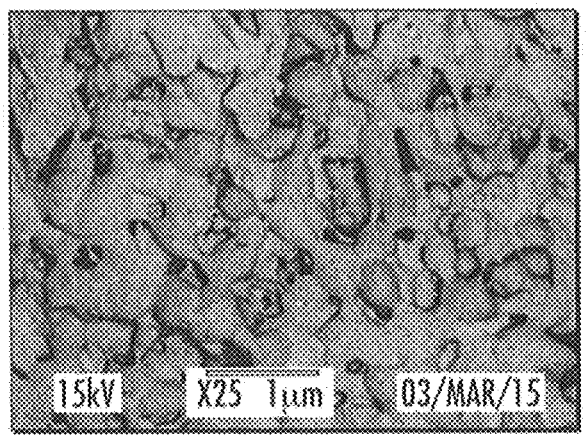
FIG. 22B illustrates the surface of a sintered element formed from polymeric particles as illustrated in FIG. 21.
Figure 22C:
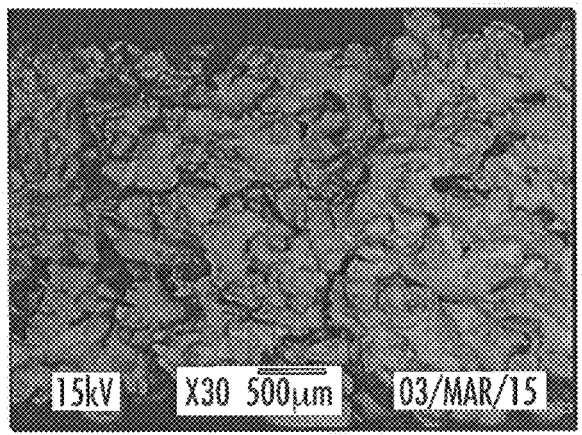
FIG. 22C illustrates a cross sectional view of a sintered element formed from polymeric particles as illustrated in FIG. 21.

FIG. 22A presents an SEM of particles of sample 9 including 15 wt %. impact modifier. FIG. 22B presents an SEM of a sintered element formed from these particles that was sintered at 295° C. for 40 minutes. FIG. 22C presents an SEM of a cross section of the sintered element.

Figure 23:
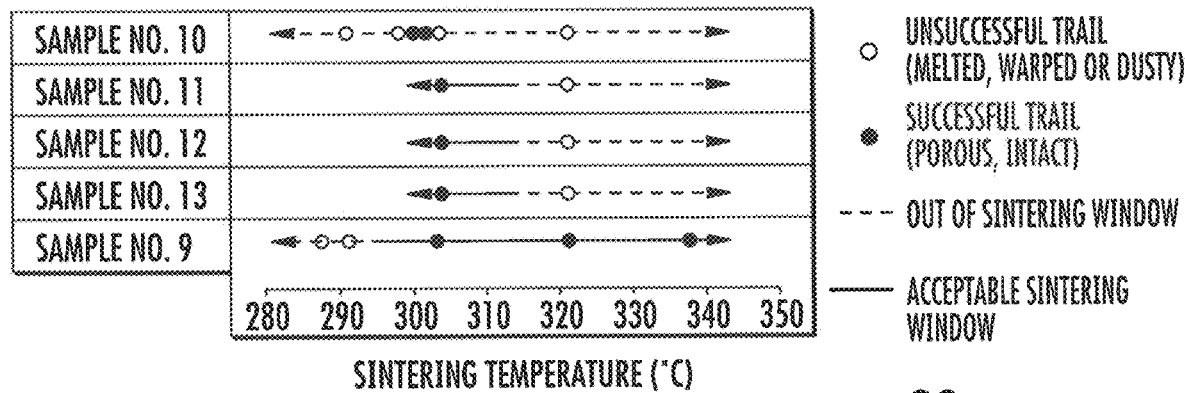
FIG. 23 illustrates the sintering window for polymeric particles formed of different thermoplastic compositions.

The appearance of the mold samples formed from sample no. 10 powders indicated that the sintering temperature for these powders was narrow. The sintering process temperature control needed to be within a 3° C. interval in order to have a successful sintering experience. While temperatures lower than this interval resulted in an insufficient binding between particles and a consequently dusty part, temperatures higher than the interval caused over-melting of the particles, shrinkage, and warpage. FIG. 23 illustrated the sintering temperature window of the different samples.

Figure 24:
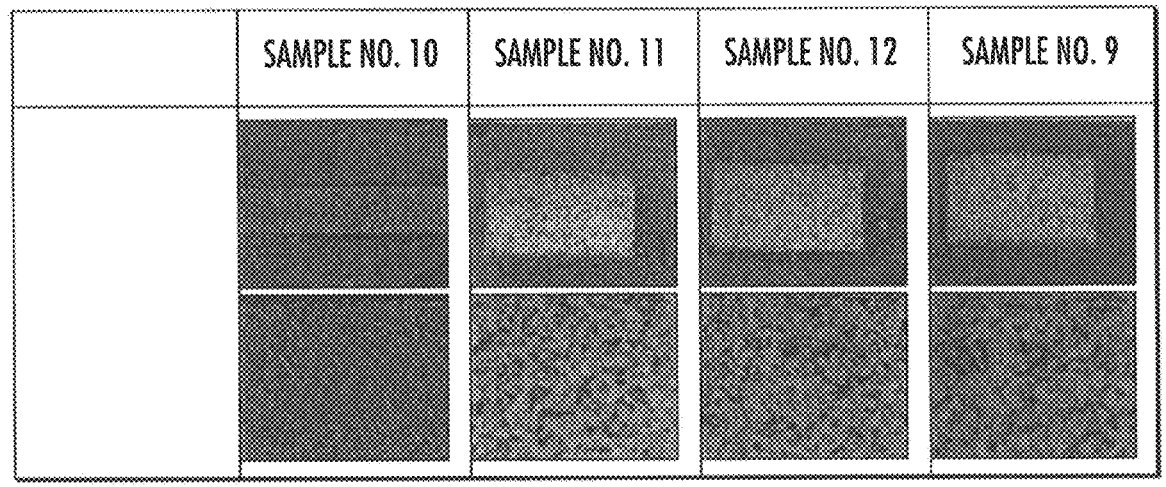
FIG. 24 presents cross-sectional views of sintered samples formed from different thermoplastic compositions.

The thermoplastic composition of Sample No. 9 included 15 wt. % of an impact modifier, and this sample had a much wider sintering temperature window, as can be seen in FIG. 23. The molded samples formed from sample no. 9 powders had very good appearance, low shrinkage, no melting and some porosity when they were sintered at a temperature range of 304°–338° C. It is believed that as the impact modifier level was increased, the sintering temperature was widened. At the same temperature of 304° C., while the sample no. 10 mold sample warped and partially melted, the samples that included impact modifier even at low levels (sample nos. 11, 12, 13) did not show signs of warpage, partial melting, or cracking. Additionally, the mold samples formed from sample nos. 11, 12, and 13 were porous, as can be seen in FIG. 24. Sample no. 10, which contained no impact modifier, largely melted. The incorporation of an impact modifier provided an increased temperature processing window for forming the sintered elements.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A porous element comprising sintered polymeric particles, the polymeric particles comprising a thermoplastic composition that includes a polyarylene sulfide and an impact modifier that includes an epoxy-functionalized olefin copolymer, the polymeric particles having a median particle size and a particle size distribution, the particle size distribution being such that 50% of the polymeric particles have a size between about 60% of the median particle size and about 140% of the median particle size, and such that 10% of the polymeric particles have a maximum particle diameter that is between about 35% and about 60% of the median particle size of the polymeric particles.

2. The porous element of claim 1, the particle size distribution being such that 50% of the polymeric particles have a size between about 80% of the median particle size and about 120% of the median particle size.

3. The porous element of claim 1, the particle size distribution being such that 80% of the polymeric particles have a size between about 35% of the median particle size and about 175% of the median particle size.

4. The porous element of claim 1, wherein the median particle size of the polymeric particles is about 1000 micrometers or less as determined via laser diffraction.

5. The porous element of claim 1, wherein the porous element has a porosity of about 30% or greater as determined according to DIN 66 133 testing protocol.

6. The porous element of claim 1, wherein the porous element defines a median pore size that is from about 10 micrometers to about 150 micrometers as determined according to DIN 66 133 testing protocol.

7. The porous element of claim 1, wherein the porous element has a tensile elongation at break of less than about 15% as determined according to ISO Test no. 527 at a temperature of 23° C. and a test speed of 5 mm/min.

8. The porous element of claim 1, wherein the porous element has a tensile strength at break of about 2 megapascals or greater as determined according to ISO Test no. 527 at a temperature of 23° C. and a test speed of 5 mm/min.

9. The porous element of claim 1, wherein the porous element has a tensile modulus of about 40 megapascals or greater as determined according to ISO Test no. 527 at a temperature of 23° C. and a test speed of 5 mm/min.

10. The porous element of claim 1, wherein the thermoplastic composition has a complex viscosity of about 20,000 poise or less at a temperature of about 200° C. or greater as determined according to a low shear sweep method.

11. The porous element of claim 1, wherein the polyarylene sulfide is a polyphenylene sulfide.

12. The porous element of claim 11, wherein the polyphenylene sulfide is a linear polyphenylene sulfide.

13. The porous element of claim 1, the thermoplastic composition comprising one or more additives.

14. The porous element of claim 1, the porous element comprising secondary particles.

15. The porous element of claim 14, wherein the secondary particles comprise inorganic particles.

16. The porous element of claim 15, the inorganic particles comprising particles of silica, quartz powder, silicates, aluminum silicate, kaolin, talc, mica, clay, diatomaceous earth, wollastonite, calcium carbonate, zeolites, carbon molecular sieves, activated carbon, or mixtures of inorganic particles.

17. The porous element of claim 1, the porous element further comprising a fibrous filler.

18. The porous element of claim 1, the porous element further comprising a secondary polymeric material.

19. The porous element of claim 1, wherein the porous element is a separation element.

20. The porous element of claim 1, wherein the porous element is a tubular structure.

21. A filter element comprising the porous element of claim 1.

22. The filter element of claim 21, wherein the porous element has an average pore size of from about 10 micrometers to about 150 micrometers and a porosity of about 30% or greater.

23. The filter element of claim 21, the filter element withstanding operation at a temperature of about 100° C. or greater without exhibiting deformation.

24. The porous element of claim 1, wherein the epoxy-functionalized olefin copolymer is an ethylene copolymer.

25. The porous element of claim 1, wherein the epoxy-functionalized olefin copolymer includes methacrylic monomer units.

26. The porous element of claim 25, wherein the methacrylic monomer units are epoxy-functionalized.

27. The porous element of claim 24, wherein the epoxy-functionalized olefin copolymer is poly(ethylene-co-methylacrylate-co-glycidyl methacrylate).

28. The porous element of claim 1, wherein the concentration of the impact modifier in the thermoplastic composition from about 0.05% to about 40% by weight.

29. The porous element of claim 1, wherein the thermoplastic composition has a melt viscosity of about 3,000 poise or greater as determined by use of a capillary rheometer at 316° C. and 400 sec$^{-1}$.

30. The porous element of claim 1, wherein the thermoplastic composition has a melt viscosity of 10,000 poise or greater as determined by use of a capillary rheometer at 316° C. and 400 sec$^{-1}$.

31. The porous element of claim 1, wherein the thermoplastic composition exhibits a degradation temperature of greater than 400° C.

32. The porous element of claim 1, wherein the porous element exhibits shrinkage during sintering of about 8% or less.

33. The porous element of claim 1, wherein the thermoplastic composition further comprises a crosslinking agent.

34. The porous element of claim 33, wherein the crosslinking agent comprises a polyfunctional carboxylic acid.

35. The porous element of claim 33 wherein the crosslinking agent comprises a metal salt of a fatty acid.

36. The porous element of claim 35, wherein the fatty acid includes 6 to 40 carbon atoms.

37. The porous element of claim 35, wherein the crosslinking agent comprises a metal stearate or a metal montanate.

38. The porous element of claim 1, wherein the polymeric particles comprise heat treated polymeric particles.

* * * * *